(12) United States Patent
Fallon et al.

(10) Patent No.: US 7,777,651 B2
(45) Date of Patent: *Aug. 17, 2010

(54) SYSTEM AND METHOD FOR DATA FEED ACCELERATION AND ENCRYPTION

(75) Inventors: James J. Fallon, Armonk, NY (US); Paul F. Pickel, Bethpage, NY (US); Stephen J. McErlain, New York, NY (US); Carlton W. Melone, Ridgewood, NJ (US)

(73) Assignee: Realtime Data LLC, New York, NY (US)

( * ) Notice: Subject to any disclaimer, the term of this patent is extended or adjusted under 35 U.S.C. 154(b) by 324 days.

This patent is subject to a terminal disclaimer.

(21) Appl. No.: 12/131,631

(22) Filed: Jun. 2, 2008

(65) Prior Publication Data

US 2009/0287839 A1    Nov. 19, 2009

Related U.S. Application Data

(63) Continuation of application No. 10/434,305, filed on May 7, 2003, now Pat. No. 7,417,568, which is a continuation-in-part of application No. 09/969,987, filed on Oct. 3, 2001.

(60) Provisional application No. 60/378,517, filed on May 7, 2002, provisional application No. 60/237,571, filed on Oct. 3, 2000.

(51) Int. Cl.
*H03M 7/34* (2006.01)
(52) U.S. Cl. .............. 341/51; 341/50; 341/67; 341/75; 341/79
(58) Field of Classification Search .............. 341/50, 341/51, 67, 79, 75
See application file for complete search history.

(56) References Cited

U.S. PATENT DOCUMENTS

| | | | |
|---|---|---|---|
| 3,394,352 A | 7/1968 | Wernikoff et al. |
| 3,490,690 A | 1/1970 | Apple et al. |
| 4,021,782 A | 5/1977 | Hoerning |
| 4,032,893 A | 6/1977 | Moran |
| 4,054,951 A | 10/1977 | Jackson et al. |
| 4,302,775 A | 11/1981 | Widergren et al. |
| 4,325,085 A | 4/1982 | Gooch |
| 4,360,840 A | 11/1982 | Wolfrun et al. |

(Continued)

FOREIGN PATENT DOCUMENTS

DE    4127518    2/1992

(Continued)

OTHER PUBLICATIONS

Expand Networks Accelerator 4000 Series User's Guide, 1999.

(Continued)

*Primary Examiner*—Jean B Jeanglaude
(74) *Attorney, Agent, or Firm*—Sterne, Kessler, Goldstein & Fox PLLC

(57) ABSTRACT

The transmission of broadcast data, such as financial data and news feeds, is accelerated over a communication channel using data compression and decompression to provide secure transmission and transparent multiplication of communication bandwidth, as well as reduce latency. Broadcast data may include packets having fields. Encoders associated with particular fields may be selected to compress those particular fields.

123 Claims, 6 Drawing Sheets

U.S. PATENT DOCUMENTS

| | | |
|---|---|---|
| 4,386,416 A | 5/1983 | Giltner et al. |
| 4,394,774 A | 7/1983 | Widergren et al. |
| 4,494,108 A | 1/1985 | Langdon, Jr. et al. |
| 4,499,499 A | 2/1985 | Brickman et al. |
| 4,574,351 A | 3/1986 | Dang et al. |
| 4,593,324 A | 6/1986 | Ohkubo et al. |
| 4,626,829 A | 12/1986 | Hauck |
| 4,682,150 A | 7/1987 | Mathes et al. |
| 4,701,745 A | 10/1987 | Waterworth |
| 4,729,020 A | 3/1988 | Schaphorst et al. |
| 4,730,348 A | 3/1988 | MacCrisken |
| 4,748,638 A | 5/1988 | Friedman et al. |
| 4,754,351 A | 6/1988 | Wright |
| 4,804,959 A | 2/1989 | Makansi et al. |
| 4,813,040 A | 3/1989 | Futato |
| 4,862,167 A | 8/1989 | Copeland, III |
| 4,866,601 A | 9/1989 | DuLac et al. |
| 4,870,415 A | 9/1989 | Van Maren et al. |
| 4,872,009 A | 10/1989 | Tsukiyama et al. |
| 4,876,541 A | 10/1989 | Storer |
| 4,888,812 A | 12/1989 | Dinan et al. |
| 4,890,282 A | 12/1989 | Lambert et al. |
| 4,897,717 A | 1/1990 | Hamilton et al. |
| 4,906,991 A | 3/1990 | Fiala et al. |
| 4,906,995 A | 3/1990 | Swanson |
| 4,929,946 A | 5/1990 | O'Brien et al. |
| 4,953,324 A | 9/1990 | Herrmann |
| 4,956,808 A | 9/1990 | Aakre et al. |
| 4,965,675 A | 10/1990 | Hori et al. |
| 4,988,998 A | 1/1991 | O'Brien |
| 5,003,307 A | 3/1991 | Whiting et al. |
| 5,016,009 A | 5/1991 | Whiting et al. |
| 5,028,922 A | 7/1991 | Huang |
| 5,045,848 A | 9/1991 | Fascenda |
| 5,045,852 A | 9/1991 | Mitchell et al. |
| 5,046,027 A | 9/1991 | Taaffe et al. |
| 5,049,881 A | 9/1991 | Gibson et al. |
| 5,091,782 A | 2/1992 | Krause et al. |
| 5,097,261 A | 3/1992 | Langdon, Jr. et al. |
| 5,109,226 A | 4/1992 | Mac Lean, Jr. et al. |
| 5,109,433 A | 4/1992 | Notenboom |
| 5,113,522 A | 5/1992 | Dinwiddie, Jr. et al. |
| 5,115,309 A | 5/1992 | Hang |
| 5,121,342 A | 6/1992 | Szymborski |
| 5,126,739 A | 6/1992 | Whiting et al. |
| 5,128,963 A | 7/1992 | Akagiri |
| 5,146,221 A | 9/1992 | Whiting et al. |
| 5,150,430 A | 9/1992 | Chu |
| 5,155,484 A | 10/1992 | Chambers, IV |
| 5,159,336 A | 10/1992 | Rabin et al. |
| 5,167,034 A | 11/1992 | MacLean, Jr. et al. |
| 5,175,543 A | 12/1992 | Lantz |
| 5,179,651 A | 1/1993 | Taaffe et al. |
| 5,187,793 A | 2/1993 | Keith et al. |
| 5,191,431 A | 3/1993 | Hasegawa et al. |
| 5,204,756 A | 4/1993 | Chevion et al. |
| 5,209,220 A | 5/1993 | Hiyama et al. |
| 5,212,742 A | 5/1993 | Normile et al. |
| 5,226,176 A | 7/1993 | Westaway et al. |
| 5,227,893 A | 7/1993 | Ett |
| 5,231,492 A | 7/1993 | Dangi et al. |
| 5,237,460 A | 8/1993 | Miller et al. |
| 5,237,675 A | 8/1993 | Hannon, Jr. |
| 5,243,341 A | 9/1993 | Seroussi et al. |
| 5,243,348 A | 9/1993 | Jackson |
| 5,247,638 A | 9/1993 | O'Brien et al. |
| 5,247,646 A | 9/1993 | Osterlund et al. |
| 5,249,053 A | 9/1993 | Jain |
| 5,263,168 A | 11/1993 | Toms et al. |
| 5,270,832 A | 12/1993 | Balkanski et al. |
| 5,280,600 A | 1/1994 | Van Maren et al. |
| 5,287,420 A | 2/1994 | Barrett |
| 5,289,580 A | 2/1994 | Latif et al. |
| 5,293,379 A | 3/1994 | Carr |
| 5,293,576 A | 3/1994 | Mihm, Jr. et al. |
| 5,307,497 A | 4/1994 | Feigenbaum et al. |
| 5,309,555 A | 5/1994 | Akins et al. |
| 5,341,440 A | 8/1994 | Earl et al. |
| 5,347,600 A | 9/1994 | Barnsley et al. |
| 5,355,498 A | 10/1994 | Provino et al. |
| 5,357,614 A | 10/1994 | Pattisam et al. |
| 5,367,629 A | 11/1994 | Chu et al. |
| 5,373,290 A | 12/1994 | Lempel et al. |
| 5,379,036 A | 1/1995 | Storer |
| 5,379,757 A | 1/1995 | Hiyama et al. |
| 5,381,145 A | 1/1995 | Allen et al. |
| 5,389,922 A | 2/1995 | Seroussi et al. |
| 5,394,534 A | 2/1995 | Kulakowski et al. |
| 5,396,228 A | 3/1995 | Garahi |
| 5,400,401 A | 3/1995 | Wasilewski et al. |
| 5,403,639 A | 4/1995 | Belsan et al. |
| 5,406,278 A | 4/1995 | Graybill et al. |
| 5,406,279 A | 4/1995 | Anderson et al. |
| 5,410,671 A | 4/1995 | Elgamal et al. |
| 5,412,384 A | 5/1995 | Chang et al. |
| 5,414,850 A | 5/1995 | Whiting |
| 5,420,639 A | 5/1995 | Perkins |
| 5,434,983 A | 7/1995 | Yaso et al. |
| 5,437,020 A | 7/1995 | Wells et al. |
| 5,452,287 A | 9/1995 | Dicecco |
| 5,454,079 A | 9/1995 | Roper et al. |
| 5,454,107 A | 9/1995 | Lehman et al. |
| 5,455,576 A | 10/1995 | Clark, II et al. |
| 5,455,680 A | 10/1995 | Shin |
| 5,461,679 A | 10/1995 | Normile et al. |
| 5,463,390 A | 10/1995 | Whiting et al. |
| 5,467,087 A | 11/1995 | Chu |
| 5,471,206 A | 11/1995 | Allen et al. |
| 5,479,587 A | 12/1995 | Campbell et al. |
| 5,479,633 A | 12/1995 | Wells et al. |
| 5,483,470 A | 1/1996 | Alur et al. |
| 5,486,826 A | 1/1996 | Remillard |
| 5,488,364 A | 1/1996 | Cole |
| 5,495,244 A | 2/1996 | Jeong et al. |
| 5,504,842 A | 4/1996 | Gentile |
| 5,506,844 A | 4/1996 | Rao |
| 5,506,872 A | 4/1996 | Mohler |
| 5,506,944 A | 4/1996 | Gentile |
| 5,528,628 A | 6/1996 | Park et al. |
| 5,530,845 A | 6/1996 | Hiatt et al. |
| 5,533,051 A | 7/1996 | James |
| 5,535,311 A | 7/1996 | Zimmerman |
| 5,535,356 A | 7/1996 | Kim et al. |
| 5,535,369 A | 7/1996 | Wells et al. |
| 5,537,658 A | 7/1996 | Bakke et al. |
| 5,539,865 A | 7/1996 | Gentile |
| 5,542,031 A | 7/1996 | Douglass et al. |
| 5,544,290 A | 8/1996 | Gentile |
| 5,546,395 A | 8/1996 | Sharma et al. |
| 5,546,475 A | 8/1996 | Bolle et al. |
| 5,553,160 A | 9/1996 | Dawson |
| 5,557,551 A | 9/1996 | Craft |
| 5,557,668 A | 9/1996 | Brady |
| 5,557,749 A | 9/1996 | Norris |
| 5,561,421 A | 10/1996 | Smith et al. |
| 5,561,824 A | 10/1996 | Carreiro et al. |
| 5,563,961 A | 10/1996 | Rynderman et al. |
| 5,574,952 A | 11/1996 | Brady et al. |
| 5,574,953 A | 11/1996 | Rust et al. |
| 5,576,953 A | 11/1996 | Hugentobler |
| 5,581,715 A | 12/1996 | Verinsky et al. |
| 5,583,500 A | 12/1996 | Allen et al. |
| 5,586,264 A | 12/1996 | Belknap et al. |
| 5,586,285 A | 12/1996 | Hasbun et al. |

| | | | | | |
|---|---|---|---|---|---|
| 5,590,306 A | 12/1996 | Watanabe et al. | 5,812,789 A | 9/1998 | Diaz et al. |
| 5,596,674 A | 1/1997 | Bhandari et al. | 5,818,368 A | 10/1998 | Langley |
| 5,604,824 A | 2/1997 | Chui et al. | 5,818,369 A | 10/1998 | Withers |
| 5,606,706 A | 2/1997 | Takamoto et al. | 5,818,530 A | 10/1998 | Canfield et al. |
| 5,610,657 A | 3/1997 | Zhang | 5,819,215 A | 10/1998 | Dobson et al. |
| 5,611,024 A | 3/1997 | Campbell et al. | 5,822,781 A | 10/1998 | Wells et al. |
| 5,612,788 A | 3/1997 | Stone | 5,825,424 A | 10/1998 | Canfield et al. |
| 5,613,069 A | 3/1997 | Walker | 5,825,830 A | 10/1998 | Kopf |
| 5,615,017 A | 3/1997 | Choi | 5,832,037 A | 11/1998 | Park |
| 5,615,287 A | 3/1997 | Fu et al. | 5,832,126 A | 11/1998 | Tanaka |
| 5,619,995 A | 4/1997 | Lobodzinski | 5,835,788 A | 11/1998 | Blumer et al. |
| 5,621,820 A | 4/1997 | Rynderman et al. | 5,836,003 A | 11/1998 | Sadeh |
| 5,623,623 A | 4/1997 | Kim et al. | 5,838,996 A | 11/1998 | deCarmo |
| 5,623,701 A | 4/1997 | Bakke et al. | 5,839,100 A | 11/1998 | Wegener |
| 5,627,534 A | 5/1997 | Craft | 5,841,979 A | 11/1998 | Schulhof et al. |
| 5,627,995 A | 5/1997 | Miller et al. | 5,847,762 A | 12/1998 | Canfield |
| 5,629,732 A | 5/1997 | Moskowitz et al. | 5,850,565 A | 12/1998 | Wightman |
| 5,630,092 A | 5/1997 | Carreiro et al. | 5,861,824 A | 1/1999 | Ryu et al. |
| 5,635,632 A | 6/1997 | Fay et al. | 5,861,920 A | 1/1999 | Mead et al. |
| 5,635,932 A | 6/1997 | Shinagawa et al. | 5,864,342 A | 1/1999 | Kajiya et al. |
| 5,638,498 A | 6/1997 | Tyler et al. | 5,867,167 A | 2/1999 | Deering |
| 5,640,158 A | 6/1997 | Okayama et al. | 5,867,602 A | 2/1999 | Zandi et al. |
| 5,642,506 A | 6/1997 | Lee | 5,870,036 A | 2/1999 | Franaszek et al. |
| 5,649,032 A | 7/1997 | Burt et al. | 5,870,087 A | 2/1999 | Chau |
| 5,652,795 A | 7/1997 | Dillon et al. | 5,872,530 A | 2/1999 | Domyo et al. |
| 5,652,857 A | 7/1997 | Shimoi et al. | 5,874,907 A | 2/1999 | Craft |
| 5,652,917 A | 7/1997 | Maupin et al. | 5,883,975 A | 3/1999 | Narita et al. |
| 5,654,703 A | 8/1997 | Clark, II | 5,884,269 A | 3/1999 | Cellier et al. |
| 5,655,138 A | 8/1997 | Kikinis | 5,886,655 A | 3/1999 | Rust |
| 5,666,560 A | 9/1997 | Moertl et al. | 5,887,165 A | 3/1999 | Martel et al. |
| 5,668,737 A | 9/1997 | Iler | 5,889,961 A | 3/1999 | Dobbek |
| 5,671,355 A | 9/1997 | Collins | 5,892,847 A | 4/1999 | Johnson |
| 5,671,389 A | 9/1997 | Saliba | 5,909,557 A | 6/1999 | Betker et al. |
| 5,671,413 A | 9/1997 | Shipman et al. | 5,909,559 A | 6/1999 | So |
| 5,675,333 A | 10/1997 | Boursier et al. | 5,915,079 A | 6/1999 | Vondran, Jr. et al. |
| 5,675,789 A | 10/1997 | Ishii et al. | 5,917,438 A | 6/1999 | Ando |
| 5,686,916 A | 11/1997 | Bakhmutsky | 5,918,068 A | 6/1999 | Shafe' |
| 5,692,159 A | 11/1997 | Shand | 5,918,225 A | 6/1999 | White et al. |
| 5,694,619 A | 12/1997 | Konno | 5,920,326 A | 7/1999 | Rentschler et al. |
| 5,696,927 A | 12/1997 | MacDonald et al. | 5,923,860 A | 7/1999 | Olarig |
| 5,703,793 A | 12/1997 | Wise et al. | 5,930,358 A | 7/1999 | Rao |
| 5,708,511 A | 1/1998 | Gandhi et al. | 5,936,616 A | 8/1999 | Torborg, Jr. et al. |
| 5,715,477 A | 2/1998 | Kikinis | 5,943,692 A | 8/1999 | Marberg et al. |
| 5,717,393 A | 2/1998 | Nakano et al. | 5,945,933 A | 8/1999 | Kalkstein |
| 5,717,394 A | 2/1998 | Schwartz et al. | 5,949,355 A | 9/1999 | Panaoussis |
| 5,719,862 A | 2/1998 | Lee et al. | 5,951,623 A | 9/1999 | Reynar et al. |
| 5,721,958 A | 2/1998 | Kikinis | 5,955,976 A | 9/1999 | Heath |
| 5,724,475 A | 3/1998 | Kirsten | 5,956,490 A | 9/1999 | Buchholz et al. |
| 5,729,228 A | 3/1998 | Franaszek et al. | 5,960,465 A | 9/1999 | Adams |
| 5,740,395 A | 4/1998 | Wells et al. | 5,964,842 A | 10/1999 | Packard |
| 5,742,773 A | 4/1998 | Blomfield-Brown et al. | 5,968,149 A | 10/1999 | Jaquette et al. |
| 5,748,904 A | 5/1998 | Huang et al. | 5,969,927 A | 10/1999 | Schirmer et al. |
| 5,757,852 A | 5/1998 | Jericevic et al. | 5,973,630 A | 10/1999 | Heath |
| 5,765,027 A | 6/1998 | Wang et al. | 5,974,235 A | 10/1999 | Nunally et al. |
| 5,767,898 A | 6/1998 | Urano et al. | 5,974,387 A | 10/1999 | Kageyama |
| 5,768,445 A | 6/1998 | Troeller et al. | 5,974,471 A | 10/1999 | Belt |
| 5,768,525 A | 6/1998 | Kralowetz et al. | 5,978,483 A | 11/1999 | Thompson, Jr. et al. |
| 5,771,340 A | 6/1998 | Nakazato et al. | 5,982,360 A | 11/1999 | Wu et al. |
| 5,774,715 A | 6/1998 | Madany et al. | 5,982,723 A | 11/1999 | Kamatani |
| 5,778,411 A | 7/1998 | DeMoss et al. | 5,987,022 A | 11/1999 | Geiger |
| 5,781,767 A | 7/1998 | Inoue et al. | 5,987,590 A | 11/1999 | Wing So |
| 5,784,572 A | 7/1998 | Rostoker et al. | 5,990,884 A | 11/1999 | Douma et al. |
| 5,787,487 A | 7/1998 | Hashimoto et al. | 5,991,515 A | 11/1999 | Fall et al. |
| 5,794,229 A | 8/1998 | French et al. | 5,996,033 A | 11/1999 | Chiu-Hao |
| 5,796,864 A | 8/1998 | Callahan | 6,000,009 A | 12/1999 | Brady |
| 5,799,110 A | 8/1998 | Israelsen et al. | 6,002,411 A | 12/1999 | Dye |
| 5,805,834 A | 9/1998 | McKinley et al. | 6,003,115 A | 12/1999 | Spear et al. |
| 5,805,932 A | 9/1998 | Kawashima et al. | 6,008,743 A | 12/1999 | Jaquette |
| 5,808,660 A | 9/1998 | Sekine et al. | 6,011,901 A | 1/2000 | Kirsten |
| 5,809,176 A | 9/1998 | Yajima | 6,014,694 A | 1/2000 | Aharoni et al. |
| 5,809,299 A | 9/1998 | Cloutier et al. | 6,023,755 A | 2/2000 | Casselman |
| 5,809,337 A | 9/1998 | Hannah et al. | 6,026,217 A | 2/2000 | Adiletta |
| 5,812,195 A | 9/1998 | Zhang | 6,028,725 A | 2/2000 | Blumenau |

| Patent | Type | Date | Inventor(s) | | Patent | Type | Date | Inventor(s) | |
|---|---|---|---|---|---|---|---|---|---|
| 6,031,939 | A | 2/2000 | Gilbert et al. | | 6,513,113 | B1 | 1/2003 | Kobayashi | |
| 6,032,148 | A | 2/2000 | Wilkes | | 6,523,102 | B1 | 2/2003 | Dye et al. | |
| 6,058,459 | A | 5/2000 | Owen et al. | | 6,526,174 | B1 | 2/2003 | Graffagnino | |
| 6,061,398 | A | 5/2000 | Satoh et al. | | 6,529,633 | B1 | 3/2003 | Easwar et al. | |
| 6,070,179 | A | 5/2000 | Craft | | 6,532,121 | B1 | 3/2003 | Rust et al. | |
| 6,073,232 | A | 6/2000 | Kroeker et al. | | 6,539,438 | B1 | 3/2003 | Ledzius et al. | |
| 6,075,470 | A | 6/2000 | Little et al. | | 6,539,456 | B2 | 3/2003 | Stewart | |
| 6,078,958 | A | 6/2000 | Echeita et al. | | 6,542,644 | B1 | 4/2003 | Satoh | |
| 6,091,777 | A | 7/2000 | Guetz et al. | | 6,577,254 | B2 | 6/2003 | Rasmussen | |
| 6,092,123 | A | 7/2000 | Steffan et al. | | 6,590,609 | B1 | 7/2003 | Kitade et al. | |
| 6,094,634 | A | 7/2000 | Yahagi et al. | | 6,597,812 | B1 | 7/2003 | Fallon et al. | |
| 6,097,520 | A | 8/2000 | Kadnier | | 6,601,104 | B1 | 7/2003 | Fallon | |
| 6,098,114 | A | 8/2000 | McDonald et al. | | 6,604,040 | B2 | 8/2003 | Kawasaki et al. | |
| 6,104,389 | A | 8/2000 | Ando | | 6,604,158 | B1 | 8/2003 | Fallon | |
| 6,105,130 | A | 8/2000 | Wu et al. | | 6,606,040 | B2 * | 8/2003 | Abdat | 341/87 |
| 6,128,412 | A | 10/2000 | Satoh | | 6,606,413 | B1 | 8/2003 | Zeineh | |
| 6,134,631 | A | 10/2000 | Jennings, III | | 6,609,223 | B1 | 8/2003 | Wolfgang | |
| 6,141,053 | A | 10/2000 | Saukkonen | | 6,618,728 | B1 | 9/2003 | Rail | |
| 6,145,020 | A | 11/2000 | Barnett | | 6,624,761 | B2 | 9/2003 | Fallon | |
| 6,145,069 | A | 11/2000 | Dye | | 6,650,261 | B2 | 11/2003 | Nelson et al. | |
| 6,169,241 | B1 | 1/2001 | Shimizu | | 6,661,839 | B1 | 12/2003 | Ishida et al. | |
| 6,170,007 | B1 | 1/2001 | Venkatraman et al. | | 6,661,845 | B1 | 12/2003 | Herath | |
| 6,170,047 | B1 | 1/2001 | Dye | | 6,704,840 | B1 | 3/2004 | Nalawadi et al. | |
| 6,170,049 | B1 | 1/2001 | So | | 6,711,709 | B1 | 3/2004 | York | |
| 6,172,936 | B1 | 1/2001 | Kitazaki | | 6,717,534 | B2 | 4/2004 | Yokose | |
| 6,173,381 | B1 | 1/2001 | Dye | | 6,731,814 | B2 | 5/2004 | Zeck et al. | |
| 6,175,650 | B1 | 1/2001 | Sindhu | | 6,745,282 | B2 | 6/2004 | Okada et al. | |
| 6,175,856 | B1 | 1/2001 | Riddle | | 6,748,457 | B2 | 6/2004 | Fallon | |
| 6,182,125 | B1 | 1/2001 | Borella et al. | | 6,756,922 | B2 | 6/2004 | Ossia | |
| 6,185,625 | B1 | 2/2001 | Tso et al. | | 6,768,749 | B1 | 7/2004 | Osler et al. | |
| 6,185,659 | B1 | 2/2001 | Milillo et al. | | 6,792,151 | B1 | 9/2004 | Barnes et al. | |
| 6,192,082 | B1 | 2/2001 | Moriarty et al. | | 6,810,434 | B2 | 10/2004 | Muthujumaraswathy et al. | |
| 6,192,155 | B1 | 2/2001 | Fan | | 6,813,689 | B2 | 11/2004 | Baxter, III | |
| 6,195,024 | B1 | 2/2001 | Fallon | | 6,819,271 | B2 | 11/2004 | Geiger et al. | |
| 6,195,465 | B1 | 2/2001 | Zandi et al. | | 6,822,589 | B1 | 11/2004 | Dye et al. | |
| 6,208,273 | B1 | 3/2001 | Dye et al. | | 6,856,651 | B2 | 2/2005 | Singh | |
| 6,215,904 | B1 | 4/2001 | Lavallee | | 6,862,278 | B1 | 3/2005 | Chang et al. | |
| 6,219,754 | B1 | 4/2001 | Belt et al. | | 6,879,266 | B1 | 4/2005 | Dye et al. | |
| 6,222,886 | B1 | 4/2001 | Yogeshwar | | 6,885,316 | B2 | 4/2005 | Mehring | |
| 6,225,922 | B1 | 5/2001 | Norton | | 6,885,319 | B2 | 4/2005 | Geiger et al. | |
| 6,226,667 | B1 | 5/2001 | Matthews et al. | | 6,888,893 | B2 | 5/2005 | Li et al. | |
| 6,226,740 | B1 | 5/2001 | Iga | | 6,909,383 | B2 | 6/2005 | Shokrollahi et al. | |
| 6,230,223 | B1 | 5/2001 | Olarig | | 6,944,740 | B2 | 9/2005 | Abali et al. | |
| 6,237,054 | B1 | 5/2001 | Freitag, Jr. | | 6,959,359 | B1 | 10/2005 | Suzuki et al. | |
| 6,243,829 | B1 | 6/2001 | Chan | | 6,963,608 | B1 | 11/2005 | Wu | |
| 6,253,264 | B1 | 6/2001 | Sebastian | | 6,993,597 | B2 | 1/2006 | Nakagawa et al. | |
| 6,272,178 | B1 * | 8/2001 | Nieweglowski et al. | 375/240.03 | 7,007,099 | B1 | 2/2006 | Donati et al. | |
| 6,272,627 | B1 | 8/2001 | Mann | | 7,054,493 | B2 | 5/2006 | Schwartz | |
| 6,272,628 | B1 | 8/2001 | Aguilar et al. | | 7,069,342 | B1 | 6/2006 | Biederman | |
| 6,282,641 | B1 | 8/2001 | Christensen | | 7,089,391 | B2 | 8/2006 | Geiger et al. | |
| 6,298,408 | B1 | 10/2001 | Park | | 7,102,544 | B1 | 9/2006 | Liu | |
| 6,308,311 | B1 | 10/2001 | Carmichael et al. | | 7,129,860 | B2 | 10/2006 | Alvarez, II et al. | |
| 6,309,424 | B1 | 10/2001 | Fallon | | 7,130,913 | B2 | 10/2006 | Fallon | |
| 6,310,563 | B1 | 10/2001 | Har et al. | | 7,161,506 | B2 | 1/2007 | Fallon | |
| 6,317,714 | B1 | 11/2001 | Del Castillo et al. | | 7,181,608 | B2 | 2/2007 | Fallon et al. | |
| 6,330,622 | B1 | 12/2001 | Schaefer | | 7,190,284 | B1 | 3/2007 | Dye et al. | |
| 6,345,307 | B1 | 2/2002 | Booth | | 7,319,667 | B1 | 1/2008 | Biederman | |
| 6,356,589 | B1 | 3/2002 | Gebler et al. | | 7,321,937 | B2 | 1/2008 | Fallon | |
| 6,356,937 | B1 | 3/2002 | Montville et al. | | 7,330,912 | B1 | 2/2008 | Fox et al. | |
| 6,392,567 | B2 | 5/2002 | Satoh | | 7,352,300 | B2 | 4/2008 | Fallon | |
| 6,404,931 | B1 | 6/2002 | Chen et al. | | 7,358,867 | B2 | 4/2008 | Fallon | |
| 6,421,387 | B1 | 7/2002 | Rhee | | 7,376,772 | B2 | 5/2008 | Fallon | |
| 6,434,168 | B1 | 8/2002 | Kari | | 7,378,992 | B2 | 5/2008 | Fallon | |
| 6,434,695 | B1 | 8/2002 | Esfahani et al. | | 7,386,046 | B2 | 6/2008 | Fallon et al. | |
| 6,442,659 | B1 | 8/2002 | Blumenau | | 7,395,345 | B2 | 7/2008 | Fallon | |
| 6,449,658 | B1 | 9/2002 | Lafe et al. | | 7,400,274 | B2 | 7/2008 | Fallon et al. | |
| 6,449,682 | B1 | 9/2002 | Toorians | | 7,415,530 | B2 | 8/2008 | Fallon | |
| 6,452,602 | B1 | 9/2002 | Morein | | 7,417,568 | B2 | 8/2008 | Fallon et al. | |
| 6,452,933 | B1 | 9/2002 | Duffield et al. | | 7,552,069 | B2 | 6/2009 | Kepecs | |
| 6,459,429 | B1 | 10/2002 | Deering | | 7,565,441 | B2 | 7/2009 | Romanik et al. | |
| 6,463,509 | B1 | 10/2002 | Teoman et al. | | 7,714,747 | B2 * | 5/2010 | Fallon | 341/51 |
| 6,487,640 | B1 | 11/2002 | Lipasti | | 2001/0031092 | A1 | 10/2001 | Zeck et al. | |
| 6,489,902 | B2 | 12/2002 | Heath | | 2001/0032128 | A1 | 10/2001 | Kepecs | |

| | | | |
|---|---|---|---|
| 2001/0047473 | A1 | 11/2001 | Fallon |
| 2001/0052038 | A1 | 12/2001 | Fallon et al. |
| 2001/0054131 | A1 | 12/2001 | Alvarez, II et al. |
| 2002/0037035 | A1 | 3/2002 | Singh |
| 2002/0069354 | A1 | 6/2002 | Fallon et al. |
| 2002/0080871 | A1 | 6/2002 | Fallon et al. |
| 2002/0097172 | A1 | 7/2002 | Fallon |
| 2002/0101367 | A1 | 8/2002 | Geiger et al. |
| 2002/0104891 | A1 | 8/2002 | Otto |
| 2002/0126755 | A1 | 9/2002 | Li et al. |
| 2002/0191692 | A1 | 12/2002 | Fallon et al. |
| 2003/0030575 | A1 | 2/2003 | Frachtenberg et al. |
| 2003/0034905 | A1 | 2/2003 | Anton et al. |
| 2003/0084238 | A1 | 5/2003 | Okada et al. |
| 2003/0090397 | A1 | 5/2003 | Rausmussen |
| 2003/0142874 | A1 | 7/2003 | Schwartz |
| 2003/0191876 | A1 | 10/2003 | Fallon |
| 2004/0042506 | A1 | 3/2004 | Fallon et al. |
| 2004/0056783 | A1 | 3/2004 | Fallon |
| 2004/0073710 | A1 | 4/2004 | Fallon |
| 2004/0073746 | A1 | 4/2004 | Fallon |
| 2006/0015650 | A1 | 1/2006 | Fallon |
| 2006/0181441 | A1 | 8/2006 | Fallon |
| 2006/0181442 | A1 | 8/2006 | Fallon |
| 2006/0184687 | A1 | 8/2006 | Fallon |
| 2006/0184696 | A1 | 8/2006 | Fallon |
| 2006/0190644 | A1 | 8/2006 | Fallon |
| 2006/0195601 | A1 | 8/2006 | Fallon |
| 2007/0043939 | A1 | 2/2007 | Fallon et al. |
| 2007/0050514 | A1 | 3/2007 | Fallon |
| 2007/0050515 | A1 | 3/2007 | Fallon |
| 2007/0067483 | A1 | 3/2007 | Fallon |
| 2007/0083746 | A1 | 4/2007 | Fallon et al. |
| 2007/0109154 | A1 | 5/2007 | Fallon |
| 2007/0109155 | A1 | 5/2007 | Fallon |
| 2007/0109156 | A1 | 5/2007 | Fallon |
| 2007/0174209 | A1 | 7/2007 | Fallon |
| 2008/0232457 | A1 | 9/2008 | Fallon et al. |
| 2009/0154545 | A1 | 6/2009 | Fallon et al. |

FOREIGN PATENT DOCUMENTS

| | | |
|---|---|---|
| EP | 0164677 | 12/1985 |
| EP | 0185098 | 6/1986 |
| EP | 0283798 | 9/1988 |
| EP | 0595406 | 5/1994 |
| EP | 0405572 | 11/1994 |
| EP | 0718751 | 6/1996 |
| EP | 0493130 | 6/1997 |
| EP | 0587437 | 2/2002 |
| GB | 2162025 | 1/1986 |
| JP | 6051989 | 2/1994 |
| JP | 9188009 | 7/1997 |
| JP | 11149376 | 6/1999 |
| WO | WO 9414273 | 6/1994 |
| WO | WO 9429852 | 12/1994 |
| WO | WO 9502873 | 1/1995 |
| WO | WO 9748212 | 6/1997 |
| WO | WO 9908186 | 2/1999 |
| WO | WO 02/39591 | 5/2002 |

OTHER PUBLICATIONS

Tridgell, Andrew; "Efficient Algorithms for Sorting and Synchronization"; A thesis submitted for the degree of Doctor of Philosophy at The Australian National University; Feb. 1999; pp. iii-106.
Jung, et al.; "Performance optimization of wireless local area networks through VLSI data compression"; Wireless Networks, vol. 4, 1998; pp. 27-39.
Jones, et al.; "Lossless data compression for short duration 3D frames in positron emission tomography", IEEE Conference Record Nuclear Science Symposium and Medical Imaging Conference; vol. 3; pp. 1831-1834.
Maier, Mark W.; "Algorithm Evaluation for the Synchronous Data Compression Standard"; University of Alabama; pp. 1-10.
Bassiouni, et al.; "A Scheme for Data Compression in Supercomputers"; IEEE; 1988; pp. 272-278.
Welch, Terry A.; "A Technique for High-Performance Data Compression"; IEEE; Jun. 1984; pp. 8-19.
ALDC: Adaptive Lossless Data Compression; IBM; 1994.
ALDC-Macro: Adaptive Lossless Data Compression; IBM Corporation; 1994.
ALDC1-20S: Adaptive Lossless Data Compression; IBM Corporation; 1994.
ALDC1-40S: Adaptive Lossless Data Compression; IBM Corporation; 1994.
ALDC1-5S: Adaptive Lossless Data Compression; IBM Corporation; 1994.
Craft, David J.; "Data Compression Choice No Easy Call"; Computer Technology Review; vol. XIV, No. 1; Jan. 1994.
Costlow, Terry; "Sony designs faster, denser tape drive"; Electronic Engineering Times; May 20, 1996, pp. 86-87.
Wilson, Ron; "IBM ups compression ante"; Electronic Engineering Times; Aug. 16, 1993; pp. 1-94.
"IBM Announces New Feature for 3480 Subsystem"; Tucson Today; vol. 12, No. 337, Jul. 25, 1989.
Syngress Media, Inc.; "CCA Citrix Certified Administrator for MetaFrame 1.8 Study Guide"; 2000.
International Telecommunication Union; "Data Compression Procedures for Data Circuit Terminating Equipment (DCE) Using Error Correction Procedures"; Geneva, 1990.
Cheng, et al.; "A fast, highly reliable data compression chip and algorithm for storage systems"; IBM J. Res. Develop.; vol. 40, No. 6, Nov. 1996; pp. 603-613.
Cisco Systems; "Cisco IOS Data Compression"; 1997; pp. 1-10.
Craft, D. J.; "A fast hardware data compression algorithm and some algorithmic extensions"; IBM J. Res. Develop.; vol. 42; No. 6; Nov. 6, 1998; pp. 733-746.
Rustici, Robert; "Enhanced CU-SeeMe"1995, Zero In Technologies, Inc.
White Pine Software; "CU-SeeMe Pro: Quick Start Guide"; Version 4.0 for Windows; 1999.
"CU-SeeMe Reflector"; www.geektimes.com/michael/CU-SeeMe/faqs/reflectors.html; accessed on Dec. 2, 2008.
Daniels, et al.; "Citrix WinFrame 1.6 Beta"; May 1, 1996; license. icopyright.net/user/downloadLicense.act?lic=3.7009-9123; accessed Dec. 2, 2008.
Held, et al.; "Data Compression"; Third Edition; John Wiley & Sons Ltd.; 1991.
Data Compression Applications and Innovations Workshop; Proceedings of a Workshop held in Conjunction with the IEEE Data Compression Conference; Snowbird, Utah; Mar. 31, 1995.
Britton, et al.; "Discovery Desktop Conferencing with NetMeeting 2.0"; IDG Books Worldwide, inc.; 1997.
Sattler, Michael; "Internet TV with CU-SeeMe"; Sams.Net Publishing; 1995; First Edition.
IBM Microelectronics Comdex Fall '93 Booth Location.
Disz, et al.; "Performance Model of the Argonne Voyager Multimedia Server"; IEEE; 1997; pp. 316-327.
"Downloading and Installing NetMeeting"; www.w4mq.com/help/h3.htm; accessed on Dec. 2, 2008.
Fox, et al.; "Adapting to Network and Client Variability via On-Demand Dynamic Distillation"; ASPLOS VII; Oct. 1996; pp. 160-170.
Fox, et al.; "Adapting to Network and Client Variation Using Infrastructural Proxies: Lessons and Perceptives"; IEEE Personal Communications, Aug. 1998; pp. 10-19.
Han, et al.; "CU-SeeMe VR Immersive Desktop Teleconferencing"; Department of Computer Science; Cornell University; To appear in ACM Multimedia 1996.
Howard, et al.; "Parallel Lossless Image Compression Using Huffman and Arithmetic Coding"; 1992; pp. 1-9.
Howard, Paul G.; "Text Image Compression Using Soft Pattern Matching"; The Computer Journal; vol. 40, No. 2/3; 1997; pp. 146-156.

Howard, et al.; "The Emerging JBIG2 Standard"; IEEE Transactions on Circuits and Systems for Video Technology, vol. 8, No. 7, Nov. 1998; pp. 838-848.
Craft, D. J.; "A fast hardware data compression algorithm and some algorithmic extensions"; Journal of Research and Development; vol. 42, No. 6, Nov. 1998; pp. 733-745.
"Direct Access Storage Device Compression and Decompression Data Flow"; IBM Technical Disclosure Bulletin; vol. 38, No. 11; Nov. 1995; pp. 291-295.
ICA Timeline, Sep. 24, 2007.
Converse, et al.; "Low Bandwidth X Extension"; Protocol Version 1.0; X Consortium; Dec. 21, 1996.
Magstar and IBM 3590 High Performance Tape Subsystem Technical Guide; Nov. 1996; IBM International Technical Support Organization.
MetaFrame Administration Student Workbook; Jun. 1998; Citrix Professional Courseware; Citrix Systems, Inc.
NCD WinCenter 3.1: Bringing Windows to Every Desktop; 1998.
Overview NetMeeting 2.1; Microsoft TechNet; technet.microsoft.com/en-us/library/cc767141(printer).aspx; accessed Dec. 2, 2008.
NetMeeting 2.1 Resource Kit; Microsoft TechNet; technet.microsoft.com/en-us/library/cc767142(printer).aspx; accessed on Dec. 2, 2008.
Conferencing Standards: NetMeeeting 2.1 Resource Kit; Microsoft TechNet; technet.microsoft.com/en-us/library/cc767150(printer).aspx; accessed Dec. 2, 2008.
Summers, Bob; "Official Microsoft NetMeeting Book"; Microsoft Press; 1998.
Zebrose, Katherine L.; "Integrating Hardware Accelerators into Internetworking Switches"; Telco Systems.
Simpson, et al.; "A Multiple Processor Approach to Data Compression"; ACM; 1998; pp. 641-649.
"IBM Technology Products Introduces New Family of High-Performance Data Compression Products"; IBM; Aug. 16, 1993.
ReadMe; PowerQuest Drive Image Pro; Version 3.00; 1994-1999; PowerQuest Corporation; p. 1-6.
Schulzrinne, et al.; "RTP Profile for Audio and Video Conferences with Minimal Control"; Jan. 1996; www.ietf.org/rfc/rfc1890.txt; accessed on Dec. 3, 2008.
Zhu, C.; "RTP Payload Format for H.263 Video Streams"; Standards Track; Sep. 1997; pp. 1-12.
Simpson, W.; "The Point-To-Point Protocol (PPP)"; Standards Track; Jul. 1994; pp. i-52.
Reynolds, et al.; "Assigned Numbers"; Standards Track; Oct. 1994; pp. 1-230.
Deutsch, et al.; "ZLIB Compressed Data Format Specification version 3.3"; Informational; May 1996; p. 1-10.
Deutsch, P.; "DEFLATE Compressed Data Format Specification version 1.3"; Informational; May 1996; pp. 1-15.
Rand, D.; "The PPP Compression Control Protocol (CCP)"; Standards Track; Jun. 1996; pp. 1-9.
Schneider, et al.; "PPP LZS-DCP Compression Protocol (LZS-DCP)"; Informational; Aug. 1996; pp. 1-18.
Friend, et al.; "PPP Stac LZS Compression Protocol"; Informational; Aug. 1996; pp. 1-20.
Schneider, et al.; "PPP for Data Compression in Data Circuit-Terminating Equipment (DCE)"; Informational; Aug. 1996; pp. 1-10.
Atkins, et al.; "PGP Message Exchange Formats"; Informational; Aug. 1996; pp. 1-21.
Castineyra, et al.; "The Nimrod Routing Architecture"; Informational, Aug. 1996; pp. 1-27.
Freed, et al.; "Multipurpose Internet Mail Extensions (MIME) Part Four: Registration Procedures"; Best Current Practice; Nov. 1996; pp. 1-21.
Shacham, et al.; "IP Payload Compression Protocol (IPComp)"; Standards Track; Dec. 1998; pp. 1-10.
Sidewinder 50 Product Manual; Seagate Technology, Inc.; 1997.
IBM RAMAC Virtual Array; IBM; Jul. 1997.
Bruni, et al.; "DB2or OS/390 and Data Compression" IBM Corporation; Nov. 1998.
Smith, Mark; "Thin Client/Server Computing Works"; WindowsITPro; Nov. 1, 1998; pp. 1-13; license.icopyright.net/user/downloadLicense.act?lic=3.7009-8355; accessed Dec. 2, 2008.

International Telecommunication Union; "Information Technology—Digital Compression and Coding of Continuous-Tone Still Images—Requirements and Guidelines"; 1993.
International Telecommunications Union; "Information technology—Lossless and near-lossless compression of continuous-tone still images—Baseline"; 1999.
Davis, Andrew W.; "The Video Answering Machine: Intel ProShare's Next Step"; Advanced Imaging; vol. 12, No. 3; Mar. 1997; pp. 28, 30.
Abbott, III, Walter D.; "A Simple, Low Overhead Data Compression Algoithm for Converting Lossy Compression Processes to Lossless"; Naval Postgraduate School Thesis; Dec. 1993.
Thomborson, Clark; "V.42bis and Other Ziv-Lempel Variants"; IEEE; 1991; p. 460.
Thomborson, Cark; "The V.42bis Standard for Data-Compressing Modems"; IEEE; Oct. 1992; pp. 41-53.
Sun, Andrew; "Using and Managing PPP"; O'Reilly & Associates, Inc.; 1999.
"What is the V42bis Standard?"; www.faqs.org/faqs/compression-faq/part1/section-10.html; accessed on Dec. 2, 2008.
"The WSDC Download Guide: Drive Image Professional for DOS, OS/2, and Windows"; wsdcds01.watson.ibm.com/WSDC.nsf/Guides/Download/Applications-DriveImage.htm; Accessed Nov. 22, 1999.
"The WSDC Download Guide: Drive Image Professional"; wsdcds01.watson.ibm.com/wsdc.nsf/Guides/Download/Applications-DirveImage.htm; accessed on May 3, 2001.
APPNOTE_TXT from pkware.txt; Version 6.3.2; PKWARE Inc., 1989.
CU-SeeMe readme.txt; Dec. 2, 1995.
CU-seeme txt from indstate.txt; README.TXT for CU-SeeMe version 0.90b1; Mar. 23, 1997.
Cuseeme txt 19960221.txt; CUSEEME.TXT; Feb. 21, 1996.
Citrix Technology Guide, 1997.
Lettieri, et al.; "Data Compression in the V.42bis Modems"; pp. 398-403, (1994).
High Performance x2/V.34+/V.42bis 56K BPS Plug & Play External Voice/FAX/Data Modem User's Manual.
H.323 Protocols Suite; www.protocols.com/pbook/h323.htm.
Hoffman, Roy; "Data Compression in Digital Systems"; Chapman & Hall; 1997; Chapter 14, pp. 344-360.
LBX X Consortium Algorithms; rzdocs.uni-hohenheim.de/aix_4.33/ext_doc/usr/share/man/info/en_US/a_doc_lib/x11 . . . ; X11R6 Technical Specifications.
Basics of Images; www.geom.uiuc.edu/events/courses/1996/cmwh/Stills/basics.html, (1996).
Official Order Granting Request for Inter Partes Reexamination of U.S. Pat. No. 6,624,761, U.S. Appl. No. 95/000,464, issued Jul. 24, 2009, 29 pgs.
Non-Final Office Action in Inter Partes Reexamination of U.S. Pat. No. 6,624,761, U.S. Appl. No. 95/000,464, issued Dec. 15, 2009, 20 pgs.
Response to Office Action in Inter Partes Reexamination of U.S. Pat. No. 7,321,937, U.S. Appl. No. 95/000,466, filed Oct. 13, 2009, 26 pgs.
Response to Office Action in Inter Partes Reexamination of U.S. Pat. No. 7,321,937, U.S. Appl. No. 95/000,466, filed Aug. 24, 2009, 39 pgs.
Non-Final Office Action in Inter Partes Reexamination of U.S. Pat. No. 7,321,937, U.S. Appl. No. 95/000,466, issued Jun. 22, 2009, 11 pgs.
Official Order Granting Request for Inter Partes Reexamination of U.S. Pat. No. 7,321,937, U.S. Appl. No. 95/000,466, issued Jun. 22, 2009, 16 pgs.
Official Action Closing Prosecution for Inter Partes Reexamination of U.S. Pat. No. 7,321,937, U.S. Appl. No. 95/000,466, issued Dec. 22, 2009, 12 pgs.
Comments by Third Party Requester to Patent Owner's Response Inter Partes Reexamination of U.S. Patent No. 7,321,937, U.S. Appl. No. 95/000,466, filed Nov. 10, 2009, 30 pgs.
Supplemental Declaration of Professor James A. Storer, Ph.D. under 37 C.F.R. §1.132 in Inter Partes Reexamination of U.S. Patent No. 7,321,937, U.S. Appl. No. 95/000,466, executed on Nov. 10, 2009, 16 pgs.

Examiner Interview Summary in Ex Parte Reexamination of U.S. Pat. No. 6,601,104, U.S. Appl. No. 90/009,428, issued Dec. 3, 2009, 3 pgs.
Response to Office Action in Ex Parte Reexamination of U.S. Pat. No. 6,601,104, U.S. Appl. No. 90/009,428, filed Dec. 28, 2009, 13 pgs.
Non-Final Office Action in Ex Parte Reexamination of U.S. Pat. No. 6,601,104, U.S. Appl. No. 90/009,428, issued Nov. 2, 2009, 13 pgs.
Official Order Granting Request for Ex Parte Reexamination of U.S. Pat. No. 6,601,104, U.S. Appl. No. 90/009,428, issued Jun. 1, 2009, 12 pgs.
Declaration of Dr. George T. Ligler under 37 C.F.R. §1.132 in Ex Parte Reexamination of U.S. Pat. No. 6,601,104, U.S. Appl. No. 90/009,428, executed Dec. 28, 2009 16 pgs.
Supplementary Declaration of Dr. George T. Ligler under 37 C.F.R. §1.132 in Ex Parte Reexamination of U.S. Pat. No. 6,601,104, U.S. Appl. No. 90/009,428, executed Dec. 30, 2009 1 pg.
Declaration of Dr. George T. Ligler under 37 C.F.R. §1.132 in Inter Partes Reexamination of U.S. Pat. No. 7,321,937, U.S. Appl. No. 95/000,466, executed Aug. 24, 2009 16 pgs.
Official Order Granting Request for Inter Partes Reexamination of U.S. Pat. No. 7,161,506, U.S. Appl. No. 95/000,479, issued Aug. 14, 2009, 41 pgs.
Non-Final Office Action in Inter Partes Reexamination of U.S. Pat. No. 7,161,506, U.S. Appl. No. 95/000,479, issued Dec. 15, 2009, 37 pgs.
Official Order Granting Request for Inter Partes Reexamination of U.S. Pat. No. 7,378,992, U.S. Appl. No. 95/000,478, issued Aug. 13, 2009, 60 pgs.
Non-Final Office Action in Inter Partes Reexamination of U.S. Pat. No. 7,378,992, U.S. Appl. No. 95/000,478, issued Dec. 15, 2009, 27 pgs.
Official Order Granting Request for Inter Partes Reexamination of U.S. Pat. No. 6,604,158 U.S. Appl. No. 95/000,486, issued Aug. 14, 2009, 35 pgs.
Non-Final Office Action in Inter Partes Reexamination of U.S. Pat. No. 6,604,158, U.S. Appl. No. 95/000,486, issued Nov. 12, 2009, 199 pgs.
Expert Report of Dr. James A. Storer on Invalidity filed on behalf of some of the defendants [Includes Appendices—Exhibits A-K (Exhibit A has been redacted pursuant to a protective order)] filed in *Realtime Data, LLC d/b/a/IXO v. Packeteer, Inc. et al.*, Civil Action No. 6:08-cv-00144-LED; U.S. District Court for the Eastern District of Texas, Jun. 10, 2009, 1090 pgs.
Supplementary Expert Report of Dr. James A. Storer on Invalidity filed on behalf of some of the defendants [Includes Appendices—Exhibits 1-8] filed in *Realtime Data, LLC d/b/a/IXO v. Packeteer, Inc. et al.*, Civil Action No. 6:08-cv-00144-LED; U.S. District Court for the Eastern District of Texas, Jun. 19, 2009, 301 pgs.
Expert Report of James B. Gambrell on Inequitable Conduct filed on behalf of some of the defendants [Includes Appendices—Exhibits A-I] filed in *Realtime Data, LLC d/b/a/IXO v. Packeteer, Inc. et al.*, Civil Action No. 6:08-cv-00144-LED; U.S. District Court for the Eastern District of Texas, Jun. 10, 2009, 199 pgs.
Report and Recommendation of United States Magistrate Judge on Motion for Partial Summary Judgment issued on Jun. 23, 2009, in *Realtime Data, LLC d/b/a/IXO v. Packeteer, Inc. et al.*, Civil Action No. 6:08-cv-00144-LED; U.S. District Court for the Eastern District of Texas, 22 pgs.
Order Adopting Report and Recommendation of United States Magistrate Judge, *Realtime Data, LLC D/B/A Ixo v. Packeteer, Inc., et al.*, District Court for the Eastern District of Texas, No. 6:08cv144, Aug. 24, 2009, 2 pgs.
Opinion and Order of United States Magistrate Judge regarding Claim Construction, *Realtime Data, LLC D/B/A Ixo v. Packeteer, Inc., et al.*, District Court for the Eastern District of Texas, No. 6:08cv144, issued Jun. 22, 2009, 75 pgs.
Script for Defendants' Joint Claim Construction Technology Tutorial Presented to the Magistrate Judge in *Realtime Data, LLC d/b/a/IXO v. Packeteer, Inc. et al.*, Civil Action No. 6:08-cv-00144-LED; U.S. District Court for the Eastern District of Texas, no date on document, 95 pgs.
Script for Realtimes' Technology Tutorial Presented to the Magistrate Judge in *Realtime Data, LLC d/b/a/IXO v. Packeteer, Inc. et al.*, Civil Action No. 6:08-cv-00144-LED; U.S. District Court for the Eastern District of Texas, Mar. 16, 2009, 69 pgs.
Opinion and Order of United States Magistrate Judge regarding Plaintiff's Motion to Strike Unauthorized New Invalidity Theories from Defendant Citrix's Opening and Reply Briefs in Support of its Motion for Summary Judgment of Invalidity, *Realtime Data, LLC D/B/A Ixo v. Packeteer, Inc., et al.*, District Court for the Eastern District of Texas, No. 6:08cv144, issued Dec. 8, 2009, 10 pgs.
Declaration of Patrick Gogerty, *Realtime Data, LLC D/B/A Ixo v. Packeteer, Inc., et al.*, District Court for the Eastern District of Texas, No. 6:08cv144, executed May 8, 2009, 3 pgs.
Defendant Citrix Systems, Inc.'s Notice Pursuant to 35 U.S.C. Section 282 Disclosures, *Realtime Data, LLC D/B/A Ixo v. Packeteer, Inc., et al.*, District Court for the Eastern District of Texas, No. 6:08cv144, filed Dec. 11, 2009, 7 pgs.
Blue Coat Defendants' Notice Pursuant to 35 U.S.C. Section 282 Disclosures, *Realtime Data, LLC D/B/A Ixo v. Packeteer, Inc., et al.*, District Court for the Eastern District of Texas, No. 6:08cv144, filed Dec. 11, 2009, 7 pgs.
Expand Networks' 35 U.S.C. Section 282 Disclosures, *Realtime Data, LLC D/B/A Ixo v. Packeteer, Inc., et al.*, District Court for the Eastern District of Texas, No. 6:08cv144, filed Dec. 11, 2009, 4 pgs.
Expand Networks' 35 U.S.C. Section 282 Disclosures (Amended), *Realtime Data, LLC D/B/A Ixo v. Packeteer, Inc., et al.*, District Court for the Eastern District of Texas, No. 6:08cv144, filed Dec. 11, 2009, 5 pgs.
Defendant Citrix Systems, Inc.'s Notice of Obviousness Combinations Pursuant to Court Order, *Realtime Data, LLC D/B/A Ixo v. Packeteer, Inc., et al.*, District Court for the Eastern District of Texas, No. 6:08cv144, filed Dec. 11, 2009, 3 pgs.
Order of United States Magistrate Judge regarding Motion to Limit the Number of Prior Art References to be Asserted at Trail, *Realtime Data, LLC D/B/A Ixo v. Packeteer, Inc., et al.*, District Court for the Eastern District of Texas, No. 6:08cv144, filed Dec. 21, 2009, 6 pgs.
Expand Defendants' Notice of Obviousness Combinations Pursuant to Court Order, *Realtime Data, LLC D/B/A Ixo v. Packeteer, Inc., et al.*, District Court for the Eastern District of Texas, No. 6:08cv144, filed Dec. 22, 2009, 3 pgs.
Blue Coat Systems, Inc. and 7-Eleven, Inc.'s Notice of Obviousness Combinations to be Used at Trial, *Realtime Data, LLC D/B/A Ixo v. Packeteer, Inc., et al.*, District Court for the Eastern District of Texas, No. 6:08cv144, filed Dec. 22, 2009, 30 pgs.
Defendant Citrix Systems, Inc's Notice of Other Prior Art References Within the Scope of the References Discussed at the Dec. 17, 2009 Hearing, *Realtime Data, LLC D/B/A Ixo v. Packeteer, Inc., et al.*, District ourt for the Eastern District of Texas, No. 6:08cv144, filed Dec. 29, 2009, 6 pgs.
Docket Listing downloaded Mar. 12, 2010 for *Realtime Data, LLC D/B/A Ixo v. Packeteer, Inc., et al.*, District Court for the Eastern District of Texas, No. 6:08cv144, filed Apr. 18, 2008, 165 pgs.
Preliminary Data Sheet, 9600 Data Compressor Processor, Hi/fn, 1997-99, HIFN 000001-68, 68 pgs.
Data Sheet, 9751 Data Compression Processor, 1997-99, HIFN 000069-187, 119 pgs.
Signal Termination Guide, Application Note, Hi/fn, 1997-98, HIFN 000188-194, 7 pgs.
How LZS Data Compression Works, Application Note, Hi/fn, 1997-99, HIFN 000195-207, 13 pgs.
Reference Hardware, 9751 Compression Processor, Hi/fn, 1997-99, HIFN 000208-221, 14 pgs.
Using 9751 in Big Endian Systems, Application Note, Hi/fn, 1997-99, HIFN 000222-234, 13 pgs.
Specification Update, 9751 Compression Processor, Hi/fn, 1997-2000, HIFN 000235-245, 11 pgs.
9732AM Product Release, Hi/fn, 1994-99, HIFN 000246-302, 57 pgs.
Data Sheet, 9732A Data Compression Processor, Hi/fn, 1997-99, HIFN 000303-353, 51 pgs.
9711 to 7711 Migration, Application Note, Hi/fn, 1997-99, HIFN 000354-361, 8 pgs.

Specification Update, 9711 Data Compression Processor, Hi/fn, 1997-99, HIFN 000362-370, 9 pgs.
Differences Between the 9710 & 9711 Processors, Application Note, Hi/fn, 1997-99, HIFN 000371-77, 7 pgs.
Specification Update, 9710 Data Compression Processor, Hi/fn, 1997-99, HIFN 000378-388, 11 pgs.
9706/9706A Data Compression Coprocessor Data Sheet, Stac Electronics, 1991-97, HIFN 000389-473, 85 pgs.
9705/9705A Data Compression Coprocessor, Stac Electronics, 1988-96, HIFN 000474-562, 88 pgs.
9705/9705A Data Compression Coprocessor Data Sheet, Stac Electronics, 1988-96, HIFN 000563-649, 87 pgs.
9700/9701 Compression Coprocessors, Hi/fn, 1997, HIFN 000650-702, 53 pgs.
Data Sheet 9610 Data Compression Processor, Hi/fn, 1997-98, HIFN 000703-744, 42 pgs.
Specification Update 9610 Data Compression Processor, Hi/fn, 1997-99, HIFN 000745-751, 7 pgs.
9705 Data Compression Coprocessor, Stac Electronics, 1988-92, HIFN 000752-831, 80 pgs.
9705 Network Software Design Guide, Application Note, Stac Electronics, 1990-91, HIFN 000832-861, 30 pgs.
Data Sheet 9601 Data Compression Processor, Hi/fn, May 21, 1998, HIFN 000862-920, 59 pgs.
7751 Encryption Processor Reference Kit, Hi/fn, Apr. 1999, HIFN 000921-1114, 194 pgs.
Hardware Data Book, Hi/fn, Nov. 1998, HIFN 001115-1430, 316 pgs.
Data Compression Data Book, Hi/fn, Jan. 1999, HIFN 001431-1889, 459 pgs.
Reference Software 7751 Encryption Processor, Hi/fn, Nov. 1998, HIFN 002164-2201, 38 pgs.
Interface Specification for Synergize Encoding/Decoding Program, JPB, Oct. 10, 1997, HIFN 002215-2216, 2 pgs.
Anderson, Chip, Extended Memory Specification Driver, 1998, HIFN 002217-2264, 48 pgs.
Whiting, Doug, LZS Hardware API, Mar. 12, 1993, HIFN 002265-68, 4 pgs.
Whiting, Doug, Encryption in Sequoia, Apr. 28, 1997, HIFN 002309-2313, 5 pgs.
LZS221-C Version 4 Data Compression Software, Data Sheet, Hi/fn, 1994-97, HIFN 002508-2525, 18 pgs.
eXtended Memory Specification (XMS), ver. 2.0, Microsoft, Jul. 19, 1988, HIFN 002670-2683, 14 pgs.
King, Stanley, Just for Your Info—From Microsoft 2, May 4, 1992, HIFN 002684-2710, 27 pgs.
eXtended Memory Specification (XMS), ver. 2.0, Microsoft, Jul. 19, 1988, HIFN 002711-2724, 14 pgs.
Advanced LZS Technology (ALZS), Whitepaper, Hi/fn, Jun. 1, 1998, HIFN 002725-2727, 3 pgs.
Secure Tape Technology (STT) Whitepaper, Hi/fn, Jun. 1, 1998, HIFN 002728-2733, 6 pgs.
SSLRef 3.0 API Details, Netscape, Nov. 19, 1996, HIFN 002734-2778, 45 pgs.
LZS221-C Version 4 Data Compression Software Data Sheet, Hi/fn, 1994-97, HIFN 002779-2796, 18 pgs.
MPPC-C Version 4 Data Compression Software Data Sheet, Hi/fn, 1994-1997, HIFN 002797-2810, 14 pgs.
Magstar MP Hardware Reference B Series Models Document GA32-0365-01, 1996-1997, [IBM__1__601 pp. 1-338], 338 pages.
Magstar MP 3570 Tape Subsystem, Operator Guide, B-Series Models, 1998-1999, [IBM__1__601 pp. 339-525], 187 pages.
Preview, IBM Magstar 3590 Tape System Enhancements, Hardware Announcement, Feb. 16, 1999, [IBM__1__601 pp. 526-527], 2 pgs.
New IBM Magstar 3590 Models E11 and E1A Enhance Tape Drive Performance, Hardware Announcement, Apr. 20, 1999, [IBM__1__601 pp. 528-540] 13 pgs.
New IBM Magstar 3590 Model A60 Dramatically Enhances Tape Drive Performance, Hardware Announcement Jul. 27, 1999, [IBM__1__601 pp. 541-550] 10 pgs.
The IBM Magstar MP Tape Subsystem Provides Fast Access to Data, Sep. 3, 1996, Announcement No. 196-176, [IBM__1__601 pp. 551-563] 13 pgs.
IBM 3590 High Performance Tape Subsystem, Apr. 10, 1995, Announcement 195-106, [IBM__1__601 pp. 564-581] 18 pgs.
Standard ECMA-222 (Jun. 1995): ECMA—Standardizing Information and Communications Systems, Adaptive Lossless Data Compression Algorithm, [IBM__1__601 pp. 564-601] 38 pgs.
IBM 3590 and 3494 Revised Availability, Hardware Announcement Aug. 8, 1995, [IBM__743__1241 p. 1] 1 pg.
Direct Delivery of IBM 3494, 3466, and 3590 Storage Products, Hardware Announcement, Sep. 30, 1997, Announcement 197-297, [IBM__743__1241 pp. 2-3] 2 pgs.
IBM Magstar 3590 Enhances Open Systems, Hardware Announcement Feb. 9, 1996, Announcement 198-014, [IBM__743__1241 pp. 4-7] 4 pgs.
Hardware Withdrawal: IBM Magstar 3590 A00 Controller—Replacement Available, Announcement No. 197-267, Withdrawal Announcement, Dec. 9, 1997, [IBM__743__1241 p. 9] 1 pg.
IBM Magstar 3590 Tape Subsystem, Introduction and Planning Guide, Document No. GA32-0329007, [IBM__743__1241 pp. 10-499] 490 pgs.
NetMeeting 2.0 Reviewers Guide, Apr. 1997, [MSCS__298__339] 42 pgs.
Microsoft NetMeeting Compatible Products and Services Directory, Apr. 1997, [MSCS__242__297] 56 pgs.
Microsoft NetMeeting "Try This!" Guide, 1997, [MSCS__340__345] 6 pgs.
The Professional Companion to NetMeeting 2—The Technical Guide to Installing, Configuring, and Supporting NetMeeting 2.0 in Your Organization—Microsoft NetMeeting 2.0, 1996-97, [MSCS__2__241] 240 pgs.
CUSeeMe 3.1.2 User Guide, Nov. 1998, [RAD__1__220] 220 pgs.
MeetingPoint Conference Server Users Guide 3.0, Nov. 1997, [RAD__221__548] 328 pgs.
MeetingPoint Conference Server Users Guide 4.0.2, Dec. 1999, [RAD__549__818] 270 pgs.
MeetingPoint Conference Service Users Guide 3.5.1, Dec. 1998, [RAD__819__1062] 244 pgs.
Enhanced CUSeeMe—Authorized Guide, 1995-1996, [RAD__1063__1372] 310 pgs.
Meeting Point Reader File, Jun. 1999, [RAD__1437__1445] 9 pgs.
Press Release—White Pine Announces Launch of MeetingPoint Conferences Server, Oct. 9, 1997, [RAD__1738__1739] 2 pgs.
Press Release—Leading Network Service Providers Line Up to Support White Pine's MeetingPoint Conference Server Technology, Oct. 9, 1997, [RAD__1740__1743] 4 pgs.
Byte—A New MeetingPoint for Videoconferencing, Oct. 9, 1997, [RAD__1744__1750] 7 pgs.
Notice of Allowance in Commonly-Assigned U.S. Appl. No. 11/651,366, issued Apr. 10, 2009, 7 pgs.
Amendment under 37 C.F.R. §1.132 in Commonly-Assigned U.S. Appl. No. 11/651,366, filed Jul. 30, 2008, 18 pgs.
CCITT Draft Recommendation T.4, RFC 804, Jan. 1981, 12 pgs.
SNA Formats, IBM Corporation, 14th Ed., Nov. 1993, 3 pgs.
Munteanu et al, "Wavelet-Based Lossless Compression Scheme with Progressive Transmission Capability," John Wiley & Sons, Inc., Int'l J. Imaging Sys. Tech., vol. 10, (1999) pp. 76-85.
Forchhammer and Jensen, "Data Compression of Scanned Halftone Images," IEEE Trans. Commun., vol. 42, Feb.-Apr. 1994, pp. 1881-1893.
Baker, K. et al., "Lossless Data Compression for Short Duration 3D Frames in Positron Emission Tomography," 0/7803-1487, May 1994, pp. 1831-1834.
Parties' Joint Claim Construction and Prehearing Statement Pursuant to P.R. 4-3, filed in *Realtime Data, LLC d/b/a/ IXO* v. *Packeteer, Inc. et al.,* Civil Action No. 6:08-cv-00144-LED; U.S. District Court for the Eastern District of Texas, (Feb. 18, 2009).
Declaration of Professor James A. Storer, Ph.D. relating to U.S. Patent No. 6,604,158, Mar. 18, 2009[a].
Declaration of Professor James A. Storer, Ph.D. relating to U.S. Patent No. 6,601,104, Mar. 18, 2009[b].
Declaration of Professor James A. Storer, Ph.D. relating to U.S. Patent No. 7,321,937, May 4, 2009.

Declaration of Professor James A. Storer, Ph.D. relating to U.S. Patent No. 6,624,761, May 4, 2009.

Declaration of Professor James A. Storer, Ph.D. relating to U.S. Patent No. 7,378,992, May 20, 2009.

Declaration of Professor James A. Storer, Ph.D. relating to U.S. Patent No. 7,161,506, May 26, 2009.

"Video Coding for Low Bit Rate Communication", International Telecommunication Union (ITU), Recommendation H.263, §3.4 (Mar. 1996) ("ITU H.263").

Rice, Robert F., "Some Practical Universal Noiseless Coding Techniques", Jet Propulsion Laboratory, Pasadena, California, JPL Publication 79-22, Mar. 15, 1979.

Anderson, J., et al. "Codec squeezes color teleconferencing through digital telephone lines", Electronics 1984, pp. 113-115.

Venbrux, Jack, "A VLSI Chip Set for High-Speed Lossless Data Compression", IEEE Trans. On Circuits and Systems for Video Technology, vol. 2, No. 44, Dec. 1992, pp. 381-391.

"Fast Dos Soft Boot", IBM Technical Disclosure Bulletin, Feb. 1994, vol. 37, Issue No. 2B, pp. 185-186.

"Operating System Platform Abstraction Method", IBM Technical Disclosure Bulletin, Feb. 1995, vol. 38, Issue No. 2, pp. 343-344.

Murashita, K., et al., "High-Speed Statistical Compression using Self-Organized Rules and Predetermined Code Tables", IEEE, 1996 Data Compression Conference.

Coene, W., et al. "A Fast Route for Application of Rate-distortion Optimal Quantization in an MPEG Video Encoder" Proceedings of the International Conference on Image Processing, US., New York, IEEE, Sep. 16, 1996, pp. 825-828.

Rice, Robert, "Lossless Coding Standards for Space Data Systems", IEEE 1058-6393/97, pp. 577-585.

Millman, Howard, "Image and video compression", Computerworld, vol. 33, Issue No. 3, Jan. 18, 1999, pp. 78.

"IBM boosts your memory", Geek.com [online], Jun. 26, 2000 [retrieved on Jul. 6, 2007], www.geek.com/ibm-boosts-your-memory/.

"IBM Research Breakthrough Doubles Computer Memory Capacity", IBM Press Release [online], Jun. 26, 2000 [retrieved on Jul. 6, 2007], www-03.ibm.com/press/us/en/pressrelease /1653.wss.

"ServerWorks to Deliver IBM's Memory eXpansion Technology in Next-Generation Core Logic for Servers", ServerWorks Press Release [online], Jun. 27, 2000 [retrieved on Jul. 14, 2000], http://www.serverworks.com/news/press/000627.html.

Abali, B., et al., "Memory Expansion Technology (MXT) Software support and performance", IBM Journal of Research and Development, vol. 45, Issue No. 2, Mar. 2001, pp. 287-301.

Franaszek, P. A., et al., "Algorithms and data structures for compressed-memory machines", IBM Journal of Research and Development, vol. 45, Issue No. 2, Mar. 2001, pp. 245-258.

Franaszek, P. A., et al., "On internal organization in compressed random-access memories", IBM Journal of Research and Development, vol. 45, Issue No. 2, Mar. 2001, pp. 259-270.

Smith, T.B., et al., "Memory Expansion Technology (MXT) Competitive impact", IBM Journal of Research and Development, vol. 45, Issue No. 2, Mar. 2001, pp. 303-309.

Tremaine, R. B., et al., "IBM Memory Expansion Technology (MXT)", IBM Journal of Research and Development, vol. 45, Issue No. 2, Mar. 2001, pp. 271-285.

Yeh, Pen-Shu, "The CCSDS Lossless Data Compression Recommendation for Space Applications", Chapter 16, Lossless Compression Handbook, Elsevier Science (USA), 2003, pp. 311-326.

\* cited by examiner

SYSTEM AND METHOD FOR DATA FEED ACCELERATION AND ENCRYPTION

CROSS REFERENCE TO RELATED APPLICATIONS

This is a continuation of patent application Ser. No. 10/434,305, filed on May 7, 2003, which is a Continuation-in-Part of U.S. patent application Ser. No. 09/969,987, filed on Oct. 3, 2001, which claims the benefit of U.S. Provisional Application No. 60/237,571, filed on Oct. 3, 2000, each of which are fully incorporated herein by reference. In addition, this claims the benefit of U.S. Provisional Application No. 60/378,517, filed on May 7, 2002, which is fully incorporated herein by reference.

TECHNICAL FIELD

The present invention relates generally to systems and method for providing data transmission, and in particular, to systems and method for providing accelerated transmission of data, such as financial trading data, financial services data, financial analytical data, company background data and news feeds, advertisements, and all other forms or information over a communication channel using data compression and decompression to provide data broadcast feeds, bi-directional data transfers, and all other forms of communication with or without security and effectively increase the bandwidth of the communication channel and/or reduce the latency of data transmission.

BACKGROUND

The financial markets and financial information services industry encompass a broad range of financial information ranging from basic stock quotations, bids, order, fulfillment, financial and quotations to analyst reports to detailed pricing of Treasury Bills and Callable bonds. Users of financial information can now generally be divided into three segments—Traders, Information Users and Analytics Users, although some users constitute components from one or more of these categories.

Traders utilize data from financial markets such as NASDAQ, the American Stock Exchange, the New York Stock Exchange, the Tokyo Exchange, the London Exchange, the Chicago Options Board, and similar institutions that offer the ability to buy and sell stocks, options, futures, bonds, derivatives, and other financial instruments. The need for vast quantities of information is vital for making informed decisions and executing optimal transactions Thus given the importance of receiving this information over computer networks, an improved system and method for providing secure point-to-point solution for transparent multiplication of bandwidth over conventional communication channels is highly desirable.

For example, with the introduction of Nasdaq's next generation trading system SuperMontage, Nasdaq will offer market data users an unparalleled view into the activity, liquidity, and transparency of the Nasdaq market.

For example, currently Nasdaq provides each market participant's best-attributed quotation in each stock in which it makes a market. This system known as SuperMontage allows Nasdaq to accept multiple orders from each market participate in each stock for execution within SuperMontage. Nasdaq offers that data, with multiple levels of interest from individual market participants, through new data services.

Nasdaq provides this data on both an aggregated and a detailed basis for the top five price levels in SuperMontage. This data is currently offered through market data vendors and broker/dealer distributors via the following four entitlement packages:

QuoteView$^{SM}$ Each SuperMontage participant's best bid and offer, as well as the best bid and offer available on SuperMontage.

DepthView$^{SM}$ The aggregate size, by price level, of all Nasdaq market participants' attributed and unattributed quotations/orders that are in the top five price levels in SuperMontage.

PowerView$^{SM}$ Bundled QuoteView and DepthView.

TotalView$^{SM}$ PowerView plus all Nasdaq market participants' attributed quotations/orders that are in the top five price levels in SuperMontage, in addition to the aggregate size of all unattributed quotes/orders at each of the top five price levels.

The NASDAQ SuperMontage trading system has been cited to be representative of trend for explosive growth in the quantity of information for all emergent and future trading and financial information distribution systems. Increases in processing power at the end user sites will allow traders, analysts, and all other interested parties to process substantially larger quantities of data in far shorter periods of time, increasing the demand substantially.

The ever increasing need for liquidity in the financials markets, coupled with the competitive pressures on reducing bid/ask spreads and instantaneous order matching/fulfillment, along the need for synchronized low latency data dissemination makes the need for the present invention ever more important. Depth of market information, required to achieve many of these goals requires orders of magnitude increases in Realtime trade information and bid/ask pricing (Best, $2^{nd}$ best, . . . ).

A fundamental problem within the current art is the high cost of implementing, disseminating, and operating trading systems such as SuperMontage within the financial services industry. This is in large part due to the high bandwidth required to transfer the large quantities of data inherent in the operation of these systems. In addition the processing power required to store, transmit, route, and display the information further compounds cost and complexity.

This fundamental problem is in large part the result of utilizing multiple simultaneous T1 lines to transmit data. The data must be multiplexed into separate data streams, transmitted on separate data lines, and de-multiplexed and checked. Software solutions have high latency and cost while hardware solutions have even higher cost and complexity with somewhat lower latency. In addition the synchronization and data integrity checking require substantial cost, complexity, inherent unreliability, and latency. These and other limitations are solved by the present invention.

Further compounding this issue is a globalization and consolidation taking place amongst the various financial exchanges. The emergence of localized exchanges (ECNS—Electronic Computer Networks) coupled with the goal of 24 hour/7 day global trading will, in and of itself, drive another exponential increase in long haul international bandwidth requirements, while ECNs and other localized trading networks will similarly drive domestic bandwidth requirements. Clearly long haul links are orders of magnitude more expensive than domestic links and the value and significance of the present invention is at least proportionately more important.

Information users range from non-finance business professionals to curious stock market investors and tend to seek basic financial information and data. Analytical users on the other hand, tend to be finance professionals who require more arcane financial information and utilize sophisticated analytical tools to manipulate and analyze data (e.g. for writing option contracts).

Historically, proprietary systems, such as Thomson, Bloomberg, Reuters and Bridge Information, have been the primary electronic source for financial information to both the informational and analytical users. These closed systems required dedicated telecommunications lines and often product-specific hardware and software. The most typical installations are land-based networking solutions such as T1, or ISDN, and satellite-based "wireless" solutions at speeds of 384 kbps.

Latency of financial data is critical to the execution of financial transactions. Indeed the more timely receipt of financial data from various sources including the New York Stock Exchange, American Stock Exchange, National Association of Securities Dealers (NASDAQ), Options Exchange, Commodities Exchanges, and Futures presents a fundamental advantage to those who trade. Latency is induced by the long time taken transmit and receive uncompressed data or to compress and encrypt data prior to transmission, along with the associated time to decrypt and decompress. Often current methods of encryption and compression take as much or substantially more time than the actual time to transmit the uncompressed, unencrypted data. Thus another problem within the current art is the latency induced by the act of encryption, compression, decryption, and decompression. The present invention overcomes this limitation within the current art.

Modern data compression algorithms suffer from poor compression, high latency, or both. Within the present art algorithms such as Lempel-Ziv, modified/embellished Lempel-Ziv, Binary Arithmetic, and Huffman coding are essentially generic algorithm having a varied effectiveness on different data types. Also small increases in compression to the negentropy limit of the data generally require exponentially greater periods of time and substantially higher latency. Negentropy is herein defined as the information content within a given piece of data. Generic algorithms are currently utilized as data types and content format is constantly changed within the financial industry. Many changes are gradual however there are also abrupt changes, such as the recent switch to decimalization to reduce granularity that has imposed substantial requirements on data transmission bandwidth infrastructure within the financial industry. Thus another problem within the current art is the high latency and poor compression due to the use of generic data compression algorithms on financial data and news feeds. This limitation is also overcome by the present invention.

Within the financial and news feeds, data is often segregated into packets for transmission. Further, in inquiry-response type systems, as found in many financial research systems, the size of request packets and also response packets is quite small. As such, response servers often wait for long periods of time (for example 500 msec) to aggregate data packets prior to transmission back to the inquirer. By aggregating the data, and then applying compression, somewhat higher compression ratios are often achieved. This then translates to lower data communications costs or more customers served for a given amount of available communications bandwidth. Thus another problem within the current art is the substantial latency caused by aggregating data packets due to poor data compression efficiency and packet overhead. This limitation is also solved by the present invention.

Another problem within the current art is the need for data redundancy. Currently many trading systems utilize two independent links to compare data to verify integrity. Second, the bandwidth of discrete last mile links, typically T1s, is limited to 1.5 Megabits/second.

Increases in bandwidth beyond this point require complex protocols to fuse data from multiple links, adding cost and complexity, while also increasing latency and inherent data error rates. This limitation is also solved by the present invention.

Another limitation within the current art is that nearly all financial institutions use one or more T1 lines to transfer information to and from their customers. While the costs of bandwidth have moderately decreased over recent years this trend is slowing and the need forever increased bandwidth will substantively overshadow any future reductions. Indeed with the recent fall-out of the telecommunications companies the data communications price wars will end and we could easily see an increase in the cost of bandwidth. US Domestic T1 lines currently range from several hundred dollars to upwards of a thousand dollars per link, dependent upon quantity of T1 lines purchased, geographic location, length of connection, and quality/conditioning of line. Fractional T1 lines may also be purchased in 64 Kilobit/second increments with some cost savings.

A standard T1 line transmits data at a rate of 1.544 megabits per second. Accounting for framing and data transmission overhead this means that a T1 line is capable of transmitting a 150 Kilobytes per second. While 30× faster than a modem line (which provides only 5 kilobytes per second), both are relatively slow in relation to any reasonable level of information flow. For example, transferring the contents of data on a single CDROM would take well over an hour!

Thus it is likely that the capacity of many existing T1 lines will be exceeded in the near future. For our current example let's assume that we need to double the capacity of a T1 line. Normally this is done by adding a second T1 line and combining the contents of both with Multi-Link Point to Point Protocol (MLPP) or another relatively complex protocol. Within the current art this is neither necessary nor desirable. In fact any increase over the current limitation of a T1 line results in the addition of a second line. This limitation is overcome by the present invention.

Another limitation with the current art is the extraordinary bandwidth required for real-time (hot) co-location processing which has been dramatically increased as a result of the acts of terror committed against the United States of America on Sep. 11, 2001. In order for the redundancy of any co-location to be effective, it must be resident in a geographically disparate location; this could be a different state, a different coast, or even a different country. The trend towards globalization will further compound the need for the ability to simultaneously process transactions at geographically diverse co-locations.

It is a widely known fact within the financial industry that the overall throughput of transactions is governed by the bandwidth and latency of the co-location data link, along with delays associated with synchronization, i.e. the transaction must be complete at both locations and each location must know that the other location is complete before the transaction is finalized.

High bandwidth links such as T3's are often utilized as part of this backbone structure. A single T3 line has the bandwidth of Twenty-Eight T1 lines (28×1.544=43.232 megabits/second). Thus, in the best case, a T3 line is capable of transmitting 5.4 megabytes/second. By way of comparison, the contents of a single CDROM may be transferred in approximately two minutes with a T3 link. As stated earlier, a single T1 line would take over an hour to transmit the same quantity of data.

The volume of real-time data that is required to operate any major financial institution is staggering by comparison. To deal with this issue only critical account and transaction information is currently processed by co-locations in real-time. In fact, many institutions use batch mode processing where the transactions are only repeated "backed up" at the co-locations some time period later, up to 15 minutes or longer. The limitation of highly significant bandwidth and/or long delays with co-location processing and long latency times is solved by the present invention.

Thus given the importance of receiving financial information over computer networks, an improved system and method for providing secure point-to-point solution for transparent multiplication of bandwidth over conventional communication channels is highly desirable.

As previously stated, these and other limitations within the current art are solved by the present invention.

SUMMARY OF THE INVENTION

The present invention is directed to systems and methods for providing accelerated data transmission, and in particular to systems and methods of providing accelerated transmission of data, such as financial trading data, financial services data, financial analytical data, company background data, news, advertisements, and all other forms of information over a communications channel utilizing data compression and decompression to provide data transfer (secure or non-secure) and effectively increase the bandwidth of the communication channel and/or reduce the latency of data transmission. The present invention is universally applicable to all forms of data communication including broadcast type systems and bi-directional systems of any manner and any number of users or sites.

These and other aspects, features and advantages, of the present invention will become apparent from the following detailed description of preferred embodiments that is to be read in connection with the accompanying drawings.

BRIEF DESCRIPTION OF PREFERRED EMBODIMENTS

DETAILED DESCRIPTION OF PREFERRED EMBODIMENTS

Figure 1:
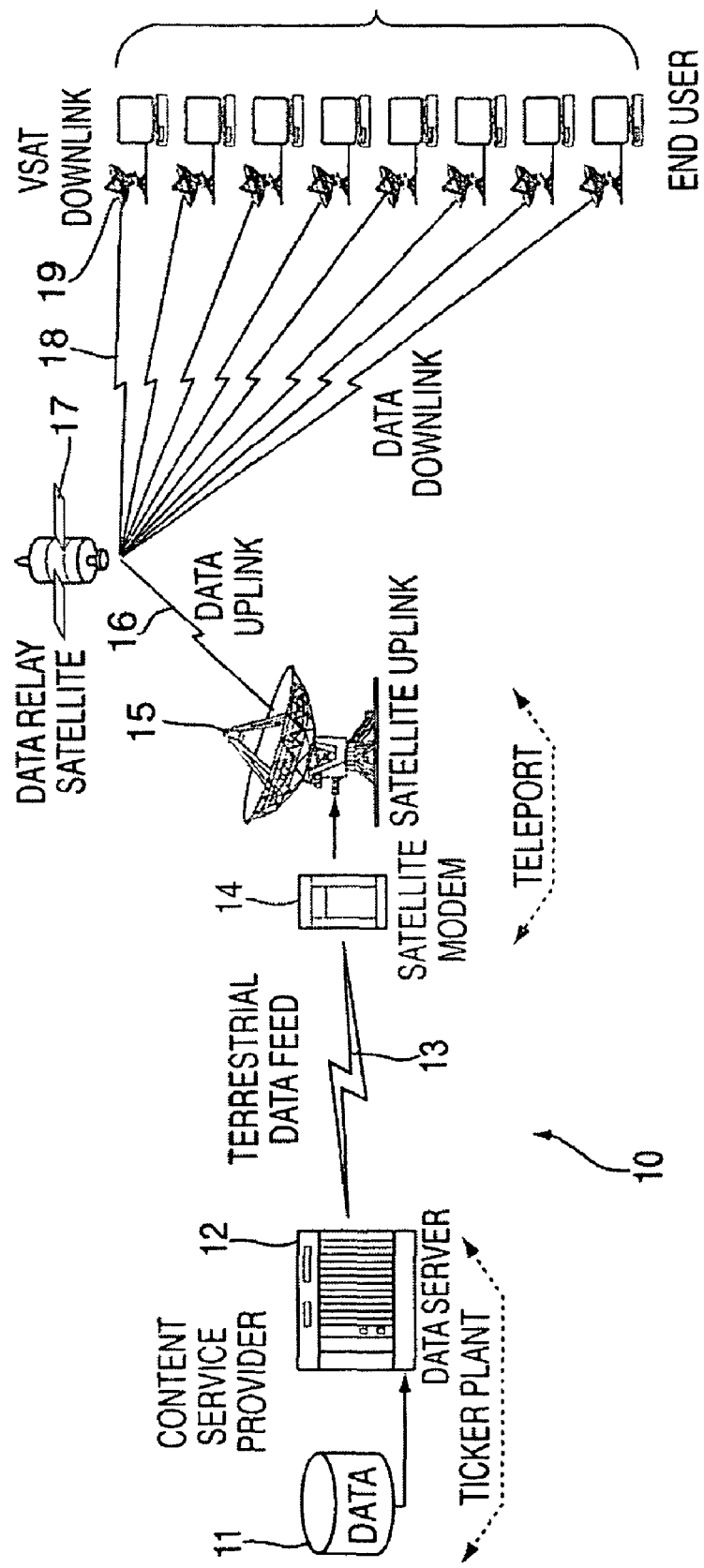
FIG. 1 is a block diagram of a system in which the present invention may be implemented for transmitting broadcast data.

The present invention is directed to systems and methods for providing accelerated transmission of broadcast data, such as financial data and news feeds, over a communication channel using data compression and decompression to provide secure transmission and transparent multiplication of communication bandwidth, as well as reduce the latency associated with data transmission of conventional systems.

In this disclosure, the following patents and patent applications, all of which are commonly owned, are fully incorporated herein by reference: U.S. Pat. Nos. 6,195,024, issued on Feb. 27, 2001, and 6,309,424, issued on Oct. 30, 2001 and U.S. patent application Ser. Nos. 10/076,013 filed on Feb. 13, 2002, 10/016,355, filed on Oct. 29, 2001, 09/481,243 filed on Jan. 11, 2000, and 09/266,394 filed on Mar. 11, 1999.

In general, the term "accelerated" data transmission refers to a process of receiving a data stream for transmission over a communication channel, compressing the broadcast data stream in real-time (wherein the term "real time" as used herein collectively refers to substantially real time, or at real time, or greater than real time) at a compression rate that increases the effective bandwidth of the communication channel, and transmitting the compressed broadcast data over the communication channel. The effective increase in bandwidth and reduction of latency of the communication channel is achieved by virtue of the fast than real-time, real-time, near real time, compression of a received data stream prior to transmission.

For instance, assume that the communication channel has a bandwidth of "B" megabytes per second. If a data transmission controller is capable of compressing (in substantially real time, real time, or faster than real time) an input data stream with an average compression rate of 3:1, then data can be transmitted over the communication channel at an effective rate of up to 3*B megabytes per second, thereby effectively increasing the bandwidth of the communication channel by a factor of three.

Further, when the receiver is capable decompressing (in substantially real time, real time, or faster than real time) the compressed data stream at a rate approximately equal to the compression rate, the point-to-point transmission rate between the transmitter and receiver is transparently increased. Advantageously, accelerated data transmission can mitigate the traditional bottleneck associated with, e.g., local and network data transmission.

If the compression and decompression are accomplished in real-time or faster, the compressed, transmitted and decompressed data is available before the receipt of an equivalent uncompressed stream. The "acceleration" of data transmission over the communication channel is achieved when the total time for compression, transmission, and decompression, is less than the total time for transmitting the data in uncompressed form. The fundamental operating principle of data acceleration is governed by the following relationship:

$$[T_{Compress} + T_{Transmit\,Accelerated} + T_{Decompress}] < T_{Transmit\,w/o\,Compression} \quad \text{EQ [1]}$$

Where:

$T_{Compress}$ = Time to Compress a Packet of Data $T_{Transmit\,Accelerated}$ = Time to Transmit Compressed Data Packet $T_{Decompress}$ = Time to Decompress the Compressed Data Packet $T_{Transmit\,w/o\,Compression}$ = Time to Transmit the Uncompressed (Original) Data Packet As stated in Equation [1] above, if the time to compress, transmit, and decompress a data packet is less than the time to transmit the data in original format, then the delivery of the data is said to be accelerated.

In the above relationship, a fundamental premise is that all information is preferably fully preserved. As such, lossless data compression is preferably applied. While this disclosure is directed to transmission of data in financial networks, for example, the concept of "acceleration" may be applied to the storage and retrieval of data to any memory or storage device using the compression methods disclosed in the above-incorporated U.S. Pat. Nos. 6,195,024 and 6,309,424, and U.S. application Ser. No. 10/016,355, and the storage acceleration techniques disclosed in the above-incorporated application Ser. No. 09/481,243 and 09/266,394.

Returning to Equation [1], data acceleration depends on several factors including the creation of compression and decompression algorithms that are both effective (achieve good compression ratios) and efficient (operate rapidly with a minimum of computing processor and memory resources).

Rearranging the terms of Equation [1] we can see that the total time to transmit data in an "accelerated" form (transmit compressed data (is the sum of the original time to transmit the data in an uncompressed fashion divided by the actual compression ratio achieved, plus the time to compress and decompress the data.

$$T_{Transmit\,Accelerated} = [T_{Transmit\,w/o\,Compression}/CR] + T_{Compress} + T_{Decompress} \quad \text{EQ [2]}$$

Where:

CR=Compression Ratio

Thus the latency reduction is the simple arithmetic difference between the time to transmit the original data minus the total time to transmit the accelerated data (per Equation 2 above), resulting in:

$$T_{Latency\,Reduction} = T_{Transmit\,w/o\,Compression} - T_{Transmit\,Accelerated} \quad \text{EQ [3]}$$

And finally the achieved "Acceleration Ratio" is defined as:

$$\text{Acceleration Ratio} = T_{Transmit\,w/o\,Compression} / T_{Transmit\,Accelerated} \quad \text{EQ [4]}$$

A number of interesting observations come to light from these relatively simple algebraic relationships and are implemented within the present invention:

Compression Ratio The present inventions achieve a consistent reduction in latency. The data compression ratio is substantial and repeatable on each data packet.

Compression Rate The present invention achieves a consistent reduction in latency. Both the time to compress and decompress the data packet must be an absolute minimum, repeatable on each data packet, and always within predefined allowable bounds.

Packet Independence: The present invention has no packet-to-packet data dependency. By way of example, in UDP and Multicast operations there are no guarantees on delivery of data packets, nor on the order of delivered data packets. IP data packets, similarly, have no guarantee on the order of delivery also. Thus algorithms that rely on dictionaries (Zlib, Glib, Lempel Ziv, etc.) are inherently unreliable in any financial real-world financial data applications.

It is to be understood that the present invention may be implemented in various forms of hardware, software, firmware, or a combination thereof. Preferably, the present invention is implemented on a computer platform including hardware such as one or more central processing units (CPU) or digital signal processors (DSP), a random access memory (RAM), and input/output (I/O) interface(s). The computer platform may also include an operating system, microinstruction code, and dedicated processing hardware utilizing combinatorial logic or finite state machines. The various processes and functions described herein may be either part of the hardware, microinstruction code or application programs that are executed via the operating system, or any combination thereof.

It is to be further understood that, because some of the constituent system components described herein are preferably implemented as software modules, the actual system connections shown in the Figures may differ depending upon the manner in that the systems are programmed. General purpose computers, servers, workstations, personal digital assistants, special purpose microprocessors, dedicated hardware, or and combination thereof may be employed to implement the present invention. Given the teachings herein, one of ordinary skill in the related art will be able to contemplate these and similar implementations or configurations of the present invention.

It should be noted that the techniques, methods, and algorithms and teachings of the present invention are representative and the present invention may be applied to any financial network, trading system, data feed or other information system.

FIG. 1 is a diagram illustrating a system in which the present invention may be implemented. The system 10 comprises content 11 and data server 12 associated with a service provider of broadcast data. The content 11 comprises information that is processed by the data server 12 to generate a broadcast, e.g., a news feed or financial data feed. As explained in further detail below, the data server 12 employs data compression to encode/encrypt the broadcast data 11 prior to transmission over various communication channels to one or more client site systems 20 of subscribing users, which comprise the necessary software and hardware to decode/decrypt the compressed broadcast data in real-time. In the exemplary embodiment of FIG. 1, the communication channels comprise a landline 13 that feeds the compressed broadcast data to a satellite system comprising modem 14 and an uplink system 15, which provides a data uplink 16 to a relay 17. The relay 17 provides data downlinks 18 to one or more downlink systems 19.

Advantageously, the proprietary software used by the data server 12 to compress the data stream in real-time and software used by the workstations 19 to decompress the data stream in real-time effectively provides a seamless and transparent increase in the transmission bandwidth of the various communication channels used, without requiring modification of existing network infrastructure.

Figure 2:
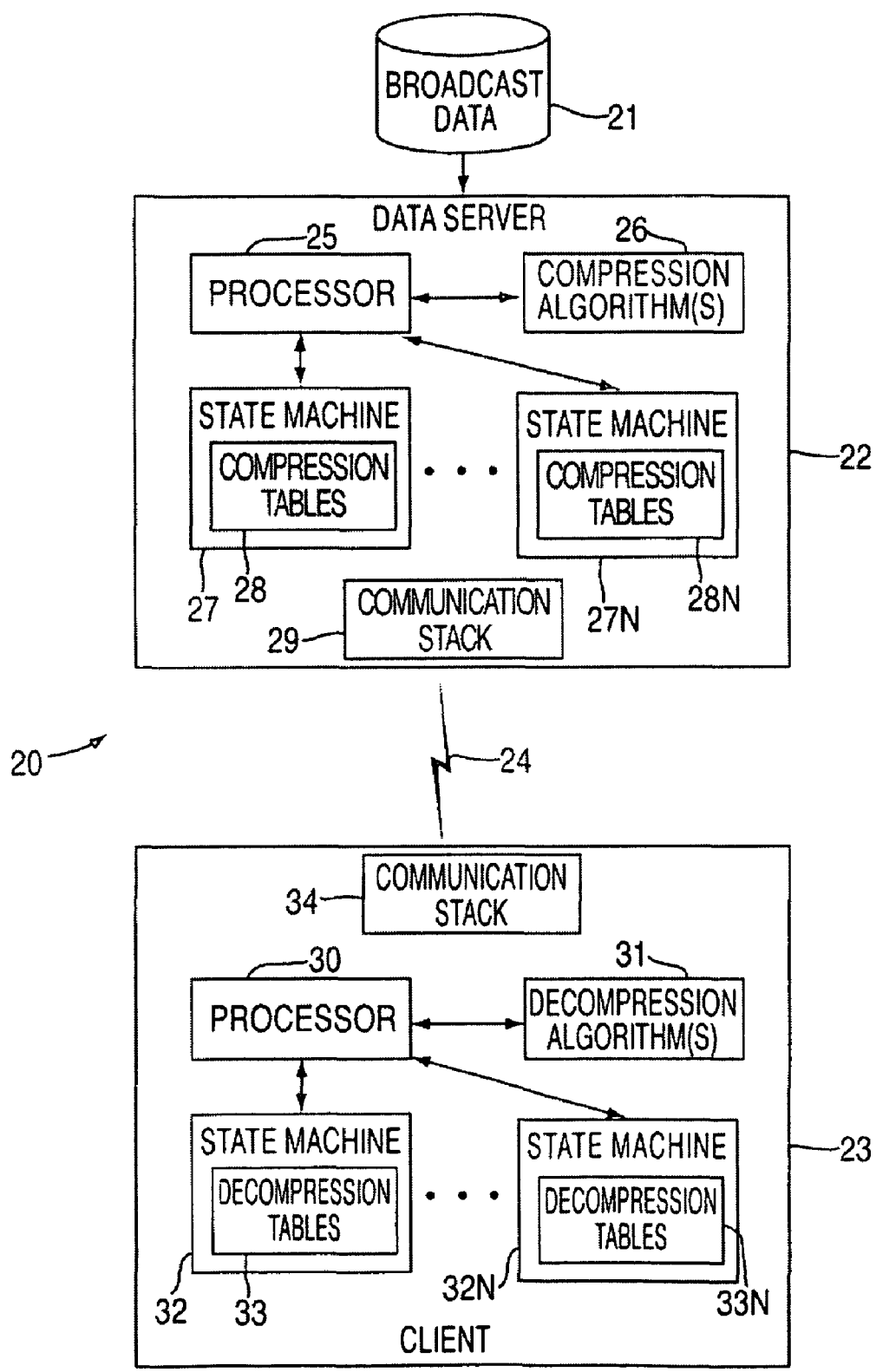
FIG. 2 is a block diagram of a system and method for providing accelerated transmission of data over a communication channel according to an embodiment of the present invention.

Referring now to FIG. 2, a block diagram illustrates a system/method for providing accelerated transmission of data according to one embodiment of the present invention. More specifically, FIG. 2 illustrates embodiments of a broadcast data server (transmitter) and client system (receiver) for implementing accelerated transmission and real-time processing of broadcast data. Broadcast data 21 (comprising one or more different broadcast types) is processed by data server 22 prior to transmission to client 23 over a communication channel 24. The data server 22 utilizes a processor 25 (e.g., microprocessor, digital signal processor, etc.) for executing one or more compression algorithms 26 for compressing (in real-time) the broadcast data 21 prior to transmission. In preferred embodiments, compression is achieved using Huffman or Arithmetic encoding, wherein one or more state machines 27-27n are constructed based on a-priori knowledge of the structure and content of one or more given broadcast and data feeds.

As explained in further detail below, each state machine 27-27n comprises a set of compression tables that comprise information for encoding the next character (text, integer, etc.) or sequence of characters in the broadcast data feed, as well as pointers which point to the next state (encoding table) based on the character or character sequence. As explained in greater detail below, a skeleton for each state machine 27-27n (nodes and pointers) is preferably built by finding sequences of characters (n-tuples) that frequently appear in a given data input. Once a skeleton has been determined, a large set of data is processed through the system and counts are kept of character n-tuples for each state. These counts are then used to construct the compression tables associated with the state machine to provide statistical compression. The compressed data is transmitted over the communication channel 24 via a communication stack using any suitable protocol (e.g., RTP (real time protocol) using RTCP (real-time control protocol), TCP/IP, UDP, or any real-time streaming protocol with suitable control mechanism).

Similarly, the client 23 comprises a processor 30 for executing one or more decompression algorithms 31. Depending one the data feed type, one of a plurality of decompression state machines 32-32n are used to decompress the compressed data stream received by the client 23 via communication stack 34. Each state machine 32-32n comprises a set of decompression tables 33-33n that comprise information for decode the next encoded character (or symbol) or sequence of symbols in the compressed broadcast data feed, as well as pointers which point to the next state based on the symbol or symbol sequence. For each compression state machine 27-27n in the data server, a corresponding decompression state machine 32-32n is needed in the client 23 to decompress the associated data stream.

Advantageously, a compression/decompression scheme according to the present invention using Huffman or Arithmetic encoding provides secure transmission via de facto or virtual "encryption" in a real-time environment. Indeed, virtual encryption is achieved by virtue of the fast, yet complex, data compression using Huffman tree, for example, without necessarily requiring actual encryption of the compressed data and decryption of the compressed data. Because of the time-sensitive nature of the market data, and the ever-changing and data-dependent nature of the arithmetic scheme, decryption is virtually impractical, or so complex and useless as to render the data worthless upon eventual decoding.

However, data compression using Huffman or Arithmetic encoding yields encoded data that is very difficult to decode than current encryption schemes such as plain text or simple bit shuffling codes as currently used by broadcast service providers. An attacker must have the compression model and the tables used to compress the data stream to be able to obtain useful information from it. Thus, at one level of security, the client-side decompression tables are preferably stored in encrypted form and are decrypted on being loaded into the processor 30 (e.g., general purpose processor, DSP, etc.) using an encryption/decryption key that is validated for a subscribing user. In this manner, a client will be unable to use the tables on other processors or sites or after terminating a service contract.

Since Huffman compression uses the same bit code for a character each time it appears in a given context, an attacker with a very large data set of compressed and uncompressed data could possibly reconstruct the tables, assuming the overall model were known. Arithmetic compression, on the other hand, generates different bit patterns for the same character in the same context depending on surrounding characters. Arithmetic encoding provides at least an order of magnitude more difficult to recover the tables from the compressed and uncompressed data streams.

The following is a detailed discussion of a compression scheme using Huffman or Arithmetic encoding for providing accelerated transmission of broadcast data according to one aspect of the present invention. It is to be appreciated that the present invention is applicable with any data stream whose statistical regularity may be captured and represented in a state machine model. For example, the present invention applies to packetized data streams, in which the packets are limited in type format and content.

In one embodiment using Huffman or Arithmetic encoding, each character or character sequence is encoded (converted to a binary code) based on the frequency of character or character sequence in a given "context". For a given context, frequently appearing characters are encoded with few bits while infrequently appearing characters are encoded with more bits. High compression ratios are obtained if the frequency distribution of characters in most contexts is highly skewed with few frequently appearing characters and many characters seldomly (or never) appear.

Figure 3:
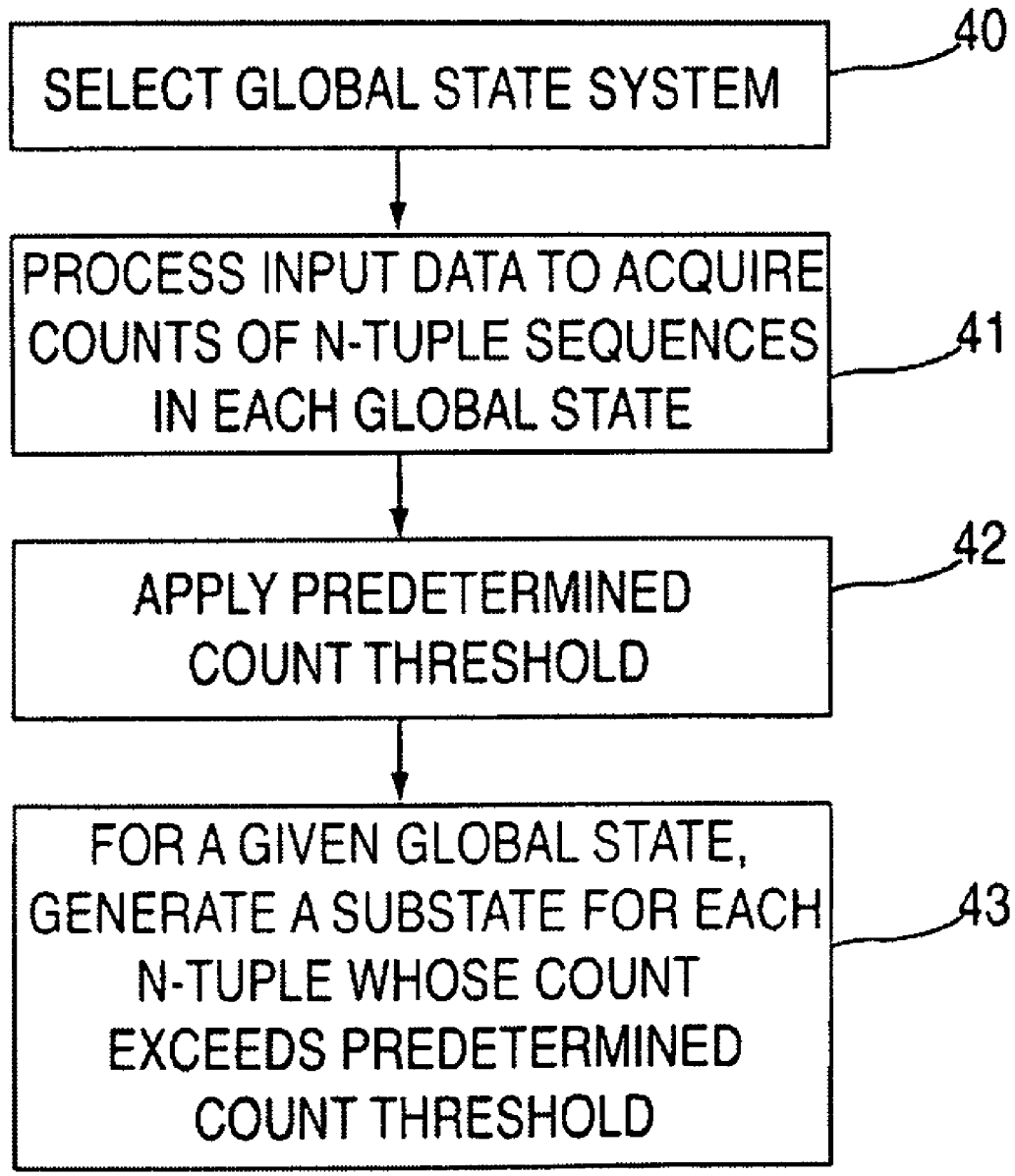
FIG. 3 is a flow diagram illustrating a method for generating compression/decompression state machines according to one aspect of the present invention.

Referring now to FIG. 3, a flow diagram illustrates a method for generating compression/decompression state machines according to one aspect of the present invention. The "context" in which a character (or character sequence) is encoded in a given broadcast stream is based on a "global state" that represents packet type and large-scale structure and the previous few characters. The first step in building a compression scheme involves selecting a global state system based on the packet structure of the broadcast model (step 40). More specifically, a global state system is constructed based on a priori knowledge of the data stream model, e.g., the packet type frequency and structure of the broadcast model. By way of example, one model for financial data may comprise four global states representing: a beginning of packet, an options packet, a NYSE (New York Stock Exchange) packet and some other packet type. Further, additional codes may be added to the encoding tables to indicate global state transitions (e.g., for an end of packet code in the broadcast model). If there is internal structure to packets, such as a header with different statistics than the body, additional global states could be added.

Once a global state system is selected, training samples from an associated data stream are passed through the global model to acquire counts of frequencies of the occurrence of n-tuple character sequences ending in each of the model states (step 41). In a preferred embodiment, the n-tuples comprise character sequences having 1, 2 and 3 characters. Using the acquired counts, sub-states (or "local states") of the predefined global states are constructed based on previous characters in the data stream. A local state may depend on either none, 1, 2, or 3 (or more) previous characters in the stream. To provide a practical limitation, a predetermined count threshold is preferably applied to the count data (step 42) and only those sequences that occur more often than the count threshold are added as local states (step 43). For example, if a three-character sequence does not occur sufficiently frequently, the count for the last two characters is tested, etc.

It is to be understood that any character sequence length "n" may be implemented depending on the application. The longer the allowed character sequence, the more memory is needed to store the encoding tables and/or the lower the count threshold should be set.

As samples of the data are passed through the state model, character (and transition code) counts for each context are accumulated. These counts are used to build the Huffman or Arithmetic coding tables. The construction of the global and local models is an iterative process. The count threshold for forming local states can be adjusted depending on the application. For instance, a larger threshold will result in less local states but less compression as well. Further, a comparison of statistics in local or global states may suggest adding or deleting global states.

The construction of the global model requires knowledge of the data stream packet structure. The construction of the local states is automatic (once the threshold is set).

Figure 4:
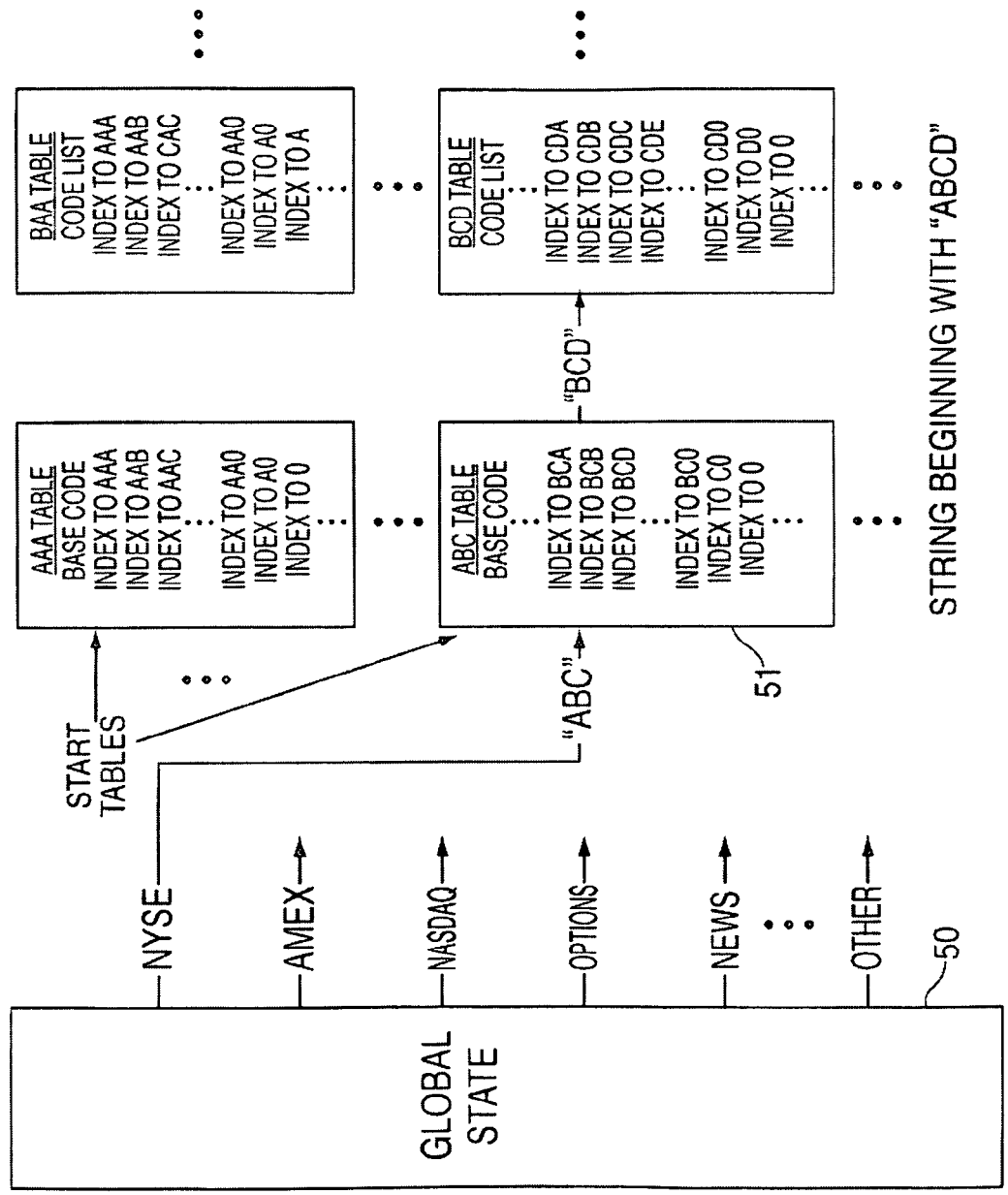
FIG. 4 is a diagram illustrating an exemplary encoding table structure according to the present invention, which may be generated using the process of FIG. 3.

FIG. 4 is a diagram of an exemplary state diagram (or encoding table structure) according to the present invention, which may be generated using the process of FIG. 3.

As noted above with reference to FIGS. 1 and 2, a compression scheme according to the present invention may be implemented in any system to provide accelerated data transmission to multiple client site systems. Preferably, the client site systems may connect at any time, so minimal immediate history may be used (since a newly connected site must be able to pick up quickly). A system according to an embodiment of the present invention uses statistical compression (Huffman or Arithmetic coding) using fixed (or adaptive) tables based on the statistics of a data feed sample. As noted above, it has been determined that the statistical compression schemes described herein are well adapted for use with structured data streams having repetitive data content (e.g., stock symbols and quotes, etc.) to provide fast and efficient data compression/decompression.

The following discussion provides further details regarding the preparation of statistical-based encoding tables and their use for compression/decompression according to the present invention. During a data compression process, the selection of which encoding table to use for compression is preferably based on up to n (where n is preferably equal to 3) preceding characters of the message. In an exemplary broadcast model tested by the present inventors, a data stream comprises messages that begin with an ID code in the range 0-31 with the remainder of the message being characters in the range 32-127. It was found that approximately half of the messages in a given sample began with ID code 0x0c and half of the remainder began with ID code 0x0f. Thus, a separate encoding table is preferably used for a message ID code. Further, separate table sets are used for messages beginning with 0x0c and with 0x0f, with the remaining messages lumped together in another table.

Each table has an additional termination code. The termination code in a "start table" indicates the end of a compression block. The termination code in all other tables indicates the end of the message. Thus, the start table comprises 33 entries and all other tables have 97 entries.

Using one table for each 3-character context would require prohibitive amounts of memory. For example, a complete one-character context would require 33+3*97=324 tables. Then, a complete two-character context would require 324*97=31,428 tables. And finally, a complete three-character context would require 324*97*97=3,048,516 tables. Preferably, as described above, the application of a count threshold at each context size reduces the amount of tables. Only when a context occurs at greater than the threshold rate in the sample will a table be created for that context.

Each table entry includes a link to the next table to be used. For instance, in an "abc" context table, the entry for next character "d" would point to the "bcd" table, if such table was created. If such table was not created, the entry for next character "d" would point to the "cd" table, if such table existed. If no "cd" table exists, the "d" table would be used and if that fails, a base table for the message type would be used.

For a client site system to pick up the broadcast feed at any time, clearly identifiable synchronization points are preferably included in the compressed data stream. In a preferred embodiment, data is compressed in blocks with each block comprising some number of complete messages. Preferably, each compressed block ends with at least four bytes with each bit being logic 1 and no interior point in the compressed block will comprise 32 consecutive 1 bits. The compressed block preferably begins with two bytes giving the decompressed size of the block shifted to guarantee that the first byte of the compressed block is not all 1's. Thus, to achieve synchronization, the client site system can scan the input compressed data stream for 4 bytes of 0xff, wherein the next byte not equal to 0xff is deemed the start of a compressed block. In other words, the receiver will accumulate the compressed data until at least a sequence of 4 bytes each having a value of 0xff is detected in the input stream, at which point decompression will commence on the compressed input stream.

In another embodiment of the present invention, if a compressed block is more than 6 bytes longer than the uncompressed data, the data block is transmitted uncompressed preceded by the shifted two-byte count with the high bit set and trailed by 4 bytes of 0xff.

The following is discussion of a method for preparing Huffman Tables according to one aspect of the present invention. The Huffman codes generated by a conventional optimal algorithm have been modified in various ways in accordance with the present invention. First, in order that there not be 32 consecutive one bits in the data stream except at the end of a compression block, a termination code in each table comprises all 1 bits.

Further, to reduce space required for decompression tables, and ensure no sequence of 32 1 bits, each code is preferably decoded as follows:

a) The first 7 bits are used to index into a table. If the character code is no more than 7 bits, it can be read directly;

b) otherwise, some number N of initial bits is discarded and the next 7 bits are used to index a second table to find the character.

Based on these steps, preferably, no character code can use more than 14 bits and all codes of more than 7 bits must fit into the code space of the N initial bits. If N is 3, for instance, then no code can use more than 10 bits.

To achieve this, the code space required for all optimal codes of more than 7 bits is first determined, following by a determining the initial offset N. Every code comprising more than N+7 bits is preferably shortened, and other codes are lengthened to balance the code tree. It is possible that this may cause the code space for codes over 7 bits to increase so that N may need to be decreased. Preferably, this process is performed in a manner that causes minimal reduction in the efficiency of the codes.

The above modifications to convention optimal algorithm yields codes in which no non-termination code ends in more than 7 1 bits, no non-termination code begins with more than 6 1 bits, no termination code is more than 14 1 bits and no non-termination packet start code begins with more than 5 1 bits. Thus, in the middle of a packet, a sequence of no more than 13 bits of logic 1 can occur, while, at the end of a packet, a sequence of no more than 26 bits of logic 1 can occur.

In another embodiment of the present invention, Arithmetic compression can be used instead of Huffman encoding. The tables for Arithmetic encoding are preferably constructed such that a sequence of 32 bits of logic 1 will not occur in the interior of a message (which is important for a random sign-on in the middle of the stream).

Arithmetic compression provides an advantage of about 6% better compression than Huffman and uses half as much memory for tables, which allows the number of tables to be increased). Indeed, the addition of more tables and/or another level of tables yields more efficient compression. Although Arithmetic compression may take about 6 times as long as Huffman, this can certainly be improved by flattening the subroutine call tree (wherein there is a subroutine call for each output bit.)

In summary, a compression scheme according to one aspect of the invention utilizes a state machine, wherein in each state, there is a compression/decompression table comprising information on how to encode/decode the next character, as well as pointers that indicated which state to go to based on that character. A skeleton of the state machine (nodes and pointers) is preferably built by finding sequences of characters that appear often in the input. Once the skeleton has been determined, a large set of data is run through the system and counts are kept of characters seen in each state. These counts are then used to construct the encode/decode tables for the statistical compression.

Other approaches may be used to build the skeleton of the state machine. A very large fraction of the traffic on a certain feed consists of messages in the digital data feed format, which is fairly constrained. It may be possible to build by hand a skeleton that takes into account this format. For instance, capital letters only appear in the symbol name at the beginning. This long-range context information can be represented with our current approach. Once a basic skeleton is in place, the structure could be extended for sequences that occur frequently.

The above-described statistical compression schemes provide content-dependent compression and decompression. In other words, for a given data stream, the above schemes are preferably structured based on the data model associated with the given stream. It is to be appreciated, however, that other compression schemes may be employed for providing accelerated data transmission in accordance with the present invention for providing effectively increased communication bandwidth and/or reduction in latency. For instance, in another embodiment of the present invention, the data compression/decompression techniques disclosed in the above-incorporated U.S. Pat. No. 6,195,024, entitled "Content Independent Data Compression Method and System" may be used in addition to, or in lieu of, the statistical based compression schemes described above.

In general, a content-independent data compression system is a data compression system that provides an optimal compression ratio for an encoded stream regardless of the data content of the input data stream. A content-independent data compression method generally comprises the steps of compressing an input data stream, which comprises a plurality of disparate data types, using a plurality of different encoders. In other words, each encoder compresses the input data stream and outputs blocks of compressed data. An encoded data stream is then generated by selectively combining compressed data blocks output from the encoders based on compression ratios obtained by the encoders. Because a multitude of different data types may be present within a given input data stream, or data block, to it is often difficult and/or impractical to predict the level of compression that will be achieved by any one encoding technique. Indeed, rather than having to first identify the different data types (e.g., ASCII, image data, multimedia data, signed and unsigned integers, pointers, etc.) comprising an input data stream and selecting a data encoding technique that yields the highest compression ratio for each of the identified data types, content-independent data compression advantageously applies the input data stream to each of a plurality of different encoders to, in effect, generate a plurality of encoded data streams. The plurality of encoders are preferably selected based on their ability to effectively encode different types of input data. Ultimately, the final compressed data stream is generated by selectively combining blocks of the compressed streams output from the plurality of encoders. Thus, the resulting compressed output stream will achieve the greatest possible compression, regardless of the data content.

In accordance with another embodiment of the present invention, a compression system may employ both a content-dependent scheme and a content-independent scheme, such as disclosed in the above-incorporated application Ser. No. 10/016,355. In this embodiment, the content-dependent scheme is used as the primary compression/decompression system and the content-independent scheme is used in place of, or in conjunction with, the content dependent scheme, when periodically checked "compression factor" meets a predetermined threshold. For instance, the compression factor may comprise a compression ratio, wherein the compression scheme will be modified when the compression ratio falls below a certain threshold. Further, the "compression factor" may comprise the latency of data transmission, wherein the data compression scheme with be modified when the latency of data transmission exceeds a predetermined threshold.

Indeed, as explained above, the efficiency of the content-dependent compression/decompression schemes described herein is achieved, e.g., by virtue of the fact that the encoding tables are based on, and specifically designed for, the known data model. However, in situations where the data model is may be modified, the efficiency of the content-dependent scheme may be adversely affected, thereby possibly resulting in a reduction in compression efficiency and/or an increase in the overall latency of data transmission. In such a situation, as a backup system, the data compression controller can switch to a content-independent scheme that provides improved compression efficiency and reduction in latency as compared to the primary content-dependent scheme.

In yet another embodiment of the present invention, when the efficiency of a content-dependent scheme falls below a predetermined threshold based on, e.g., a change in the data structure of the data stream, the present invention preferably comprises an automatic mechanism to adaptively modify the encoding tables to generate optimal encoding tables (using the process described above with reference to FIG. 3).

Figure 5:
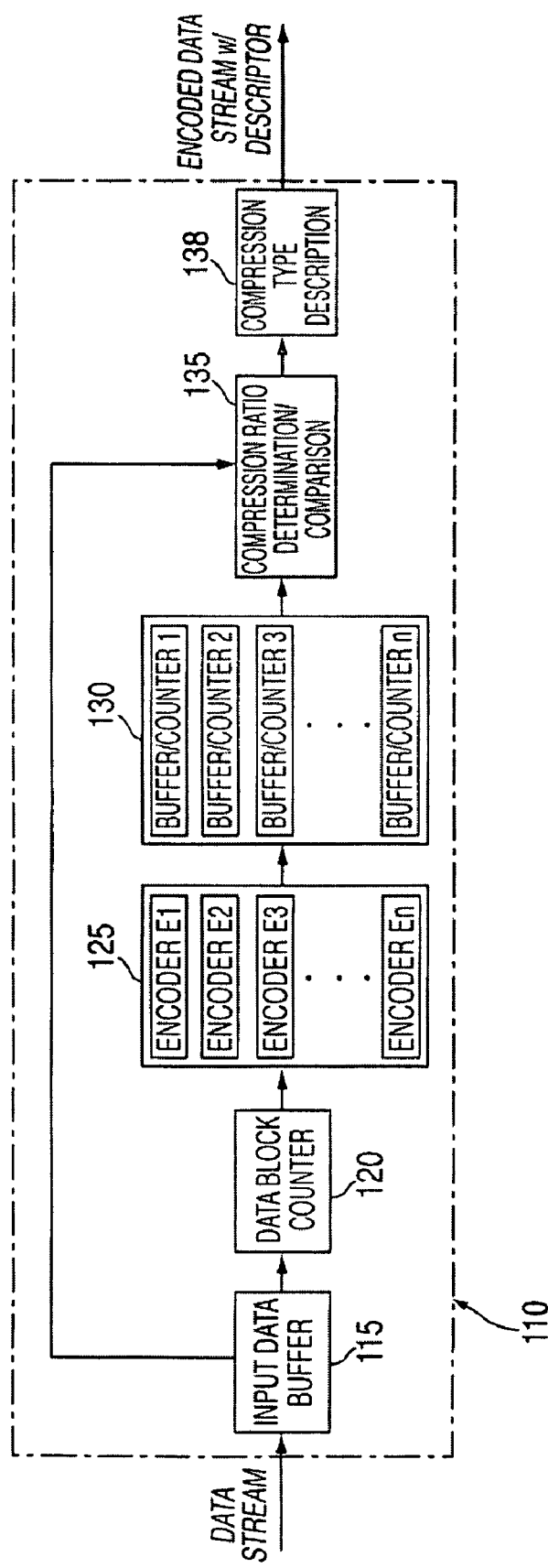
FIG. 5 is a diagram of a system/method for providing content independent data compression, which may be implemented for providing accelerated data transmission according to the present invention.

FIG. 5 is a detailed block diagram illustrates an exemplary content-independent data compression system 110 that may be employed herein. Details of this data compression system are provided in U.S. Pat. No. 6,195,024, which is fully incorporated herein by reference. In this embodiment, the data compression system 110 accepts data blocks from an input data stream and stores the input data block in an input buffer or cache 115. It is to be understood that the system processes the input data stream in data blocks that may range in size from individual bits through complete files or collections of multiple files. Additionally, the input data block size may be fixed or variable. A counter 120 counts or otherwise enumerates the size of input data block in any convenient units including bits, bytes, words, and double words. It should be noted that the input buffer 115 and counter 120 are not required elements of the present invention. The input data buffer 115 may be provided for buffering the input data stream in order to output an uncompressed data stream in the event that, as discussed in further detail below, every encoder fails to achieve a level of compression that exceeds an a priori specified minimum compression ratio threshold.

Data compression is performed by an encoder module 125 that may comprise a set of encoders E1, E2, E3 ... En. The encoder set E1, E2, E3 ... En may include any number "n" (where n may=1) of those lossless encoding techniques currently well known within the art such as run length, Huffman, Lempel-Ziv Dictionary Compression, arithmetic coding, data compaction, and data null suppression. It is to be understood that the encoding techniques are selected based upon their ability to effectively encode different types of input data. It is to be appreciated that a full complement of encoders are preferably selected to provide a broad coverage of existing and future data types.

The encoder module 125 successively receives as input each of the buffered input data blocks (or unbuffered input data blocks from the counter module 120). Data compression is performed by the encoder module 125 wherein each of the encoders E1 ... En processes a given input data block and outputs a corresponding set of encoded data blocks. It is to be appreciated that the system affords a user the option to enable/disable any one or more of the encoders E1 ... En prior to operation. As is understood by those skilled in the art, such feature allows the user to tailor the operation of the data compression system for specific applications. It is to be further appreciated that the encoding process may be performed either in parallel or sequentially. In particular, the encoders E1 through En of encoder module 125 may operate in parallel (i.e., simultaneously processing a given input data block by utilizing task multiplexing on a single central processor, via dedicated hardware, by executing on a plurality of processor or dedicated hardware systems, or any combination thereof). In addition, encoders E1 through En may operate sequentially on a given unbuffered or buffered input data block. This process is intended to eliminate the complexity and additional processing overhead associated with multiplexing concurrent encoding techniques on a single central processor and/or dedicated hardware, set of central processors and/or dedicated hardware, or any achievable combination. It is to be further appreciated that encoders of the identical type may be applied in parallel to enhance encoding speed. For instance, encoder E1 may comprise two parallel Huffman encoders for parallel processing of an input data block.

A buffer/counter module 130 is operatively connected to the encoder module 125 for buffering and counting the size of each of the encoded data blocks output from encoder module 125. Specifically, the buffer/counter 130 comprises a plurality of buffer/counters BC1, BC2, BC3 ... BCn, each operatively associated with a corresponding one of the encoders E1 ... En. A compression ratio module 135, operatively connected to the output buffer/counter 130, determines the compression ratio obtained for each of the enabled encoders E1 ... En by taking the ratio of the size of the input data block to the size of the output data block stored in the corresponding buffer/counters BC1 ... BCn. In addition, the compression ratio module 135 compares each compression ratio with an a priori-specified compression ratio threshold limit to determine if at least one of the encoded data blocks output from the enabled encoders E1 ... En achieves a compression that exceeds an a priori-specified threshold. As is understood by those skilled in the art, the threshold limit may be specified as any value inclusive of data expansion, no data compression or expansion, or any arbitrarily desired compression limit. A description module 138, operatively coupled to the compression ratio module 135, appends a corresponding compression type descriptor to each encoded data block which is selected for output so as to indicate the type of compression format of the encoded data block. A data compression type descriptor is defined as any recognizable data token or descriptor that indicates which data encoding technique has been applied to the data. It is to be understood that, since encoders of the identical type may be applied in parallel to enhance encoding speed (as discussed above), the data compression type descriptor identifies the corresponding encoding technique applied to the encoded data block, not necessarily the specific encoder. The encoded data block having the greatest compression ratio along with its corresponding data compression type descriptor is then output for subsequent data processing or transmittal. If there are no encoded data blocks having a compression ratio that exceeds the compression ratio threshold limit, then the original unencoded input data block is selected for output and a null data compression type descriptor is appended thereto. A null data compression type descriptor is defined as any recognizable data token or descriptor that indicates no data encoding has been applied to the input data block. Accordingly, the unencoded input data block with its corresponding null data compression type descriptor is then output for subsequent data processing or transmittal.

Again, it is to be understood that the embodiment of the data compression engine of FIG. 5 is exemplary of a preferred compression system which may be implemented in the present invention, and that other compression systems and methods known to those skilled in the art may be employed for providing accelerated data transmission in accordance with the teachings herein. Indeed, in another embodiment of the compression system disclosed in the above-incorporated U.S. Pat. No. 6,195,024, a timer is included to measure the time elapsed during the encoding process against an a priori-specified time limit. When the time limit expires, only the data output from those encoders (in the encoder module 125) that have completed the present encoding cycle are compared to determine the encoded data with the highest compression ratio. The time limit ensures that the real-time or pseudo real-time nature of the data encoding is preserved. In addition, the results from each encoder in the encoder module 125 may be buffered to allow additional encoders to be sequentially applied to the output of the previous encoder, yielding a more optimal lossless data compression ratio. Such techniques are discussed in greater detail in the above-incorporated U.S. Pat. No. 6,195,024.

Figure 6:
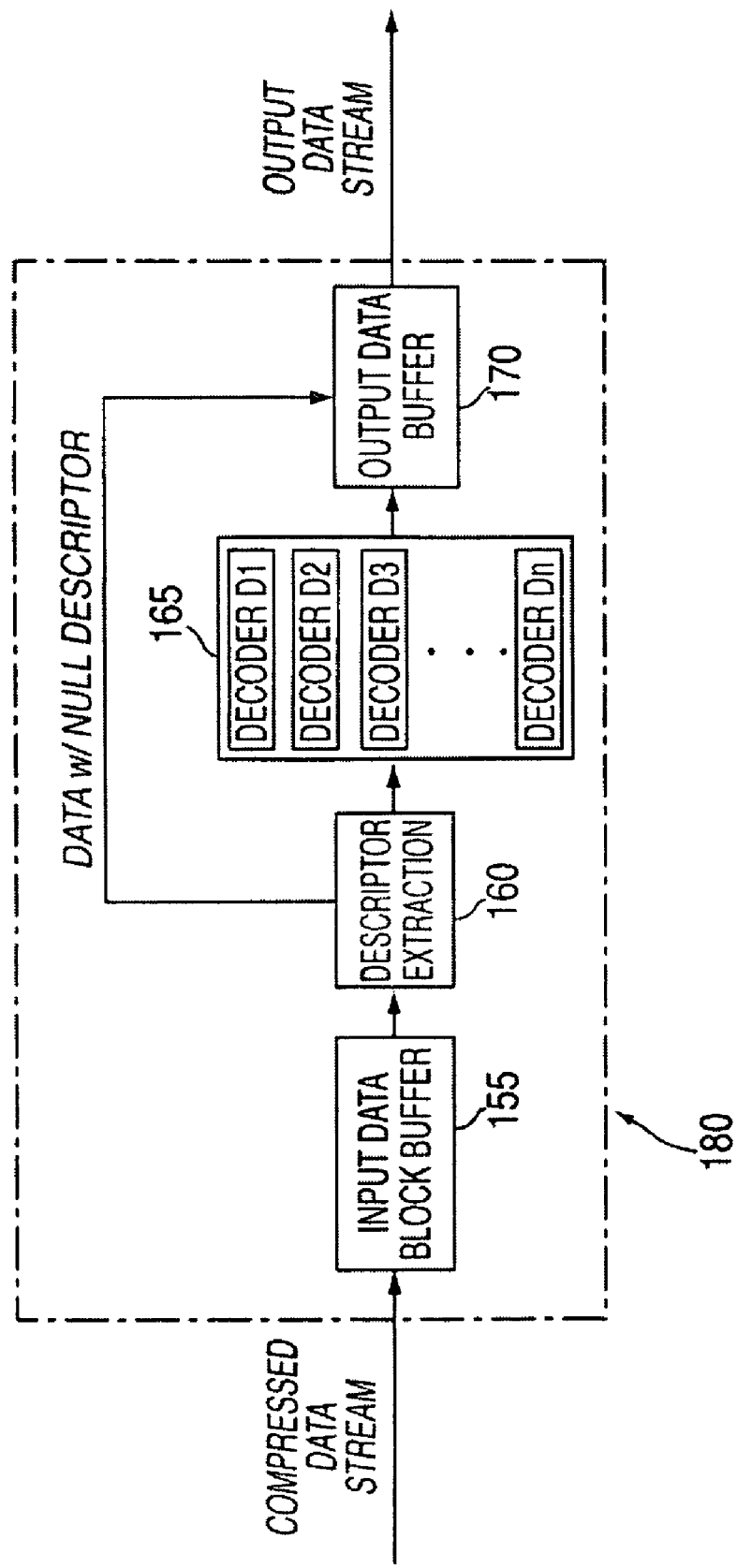
FIG. 6 is a diagram of a system/method for providing content independent data decompression, which may be implemented for providing accelerated data transmission according to the present invention.

Referring now to FIG. 6, a detailed block diagram illustrates an exemplary decompression system that may be employed herein or accelerated data transmission as disclosed in the above-incorporated U.S. Pat. No. 6,195,024. In this embodiment, the data compression engine 180 accepts compressed data blocks received over a communication channel. The decompression system processes the input data stream in data blocks that may range in size from individual bits through complete files or collections of multiple files. Additionally, the input data block size may be fixed or variable.

The data decompression engine 180 comprises an input buffer 155 that receives as input an uncompressed or compressed data stream comprising one or more data blocks. The data blocks may range in size from individual bits through complete files or collections of multiple files. Additionally, the data block size may be fixed or variable. The input data buffer 55 is preferably included (not required) to provide storage of input data for various hardware implementations. A descriptor extraction module 160 receives the buffered (or unbuffered) input data block and then parses, lexically, syntactically, or otherwise analyzes the input data block using methods known by those skilled in the art to extract the data compression type descriptor associated with the data block. The data compression type descriptor may possess values corresponding to null (no encoding applied), a single applied encoding technique, or multiple encoding techniques applied in a specific or random order (in accordance with the data compression system embodiments and methods discussed above).

A decoder module 165 includes one or more decoders D1 . . . Dn for decoding the input data block using a decoder, set of decoders, or a sequential set of decoders corresponding to the extracted compression type descriptor. The decoders D1 . . . Dn may include those lossless encoding techniques currently well known within the art, including: run length, Huffman, Lempel-Ziv Dictionary Compression, arithmetic coding, data compaction, and data null suppression. Decoding techniques are selected based upon their ability to effectively decode the various different types of encoded input data generated by the data compression systems described above or originating from any other desired source.

As with the data compression systems discussed in the above-incorporated U.S. Pat. No. 6,195,024, the decoder module 165 may include multiple decoders of the same type applied in parallel so as to reduce the data decoding time. An output data buffer or cache 170 may be included for buffering the decoded data block output from the decoder module 165. The output buffer 70 then provides data to the output data stream. It is to be appreciated by those skilled in the art that the data compression system 180 may also include an input data counter and output data counter operatively coupled to the input and output, respectively, of the decoder module 165. In this manner, the compressed and corresponding decompressed data block may be counted to ensure that sufficient decompression is obtained for the input data block.

Again, it is to be understood that the embodiment of the data decompression system 180 of FIG. 6 is exemplary of a preferred decompression system and method which may be implemented in the present invention, and that other data decompression systems and methods known to those skilled in the art may be employed for providing accelerated data transmission in accordance with the teachings herein.

It is to be appreciated that a data transmission acceleration system according to the present invention offers a business model by which market data vendors and users in the financial information services industry can receive various benefits. For example, the present invention affords transparent multiplication of bandwidth with minimal latency. Experiments have shown that increased bandwidth of up to 3 times can be achieved with minimal latency. Furthermore, proprietary hardware, including chip and board designs, as well as custom embedded and application software and algorithms associated with accelerated data transmission provide a cost-effective solution that can be seamlessly integrated with existing products and infrastructure. Moreover, the data acceleration through "real-time" compression and decompression affords a dramatic reduction in ongoing bandwidth costs. Further, the present invention provides mechanism to differentiate data feeds from other vendors via enriched content or quantity of the data feed.

In addition, a data compression scheme according to the present invention provides dramatically more secure and encrypted feed from current levels, thus, providing the ability to employ a secure and accelerated virtual private network over the Internet for authorized subscribers or clients with proprietary hardware and software installed.

Moreover, the present invention offers the ability to reduce a client's ongoing monthly bandwidth costs as an incentive to subscribe to a vendor's data feed service.

The present invention is readily extendable for use on a global computer network such as the Internet. This is significant since it creates a virtual private network and is important for the market data vendors and others due to its reduced cost in closed network/bandwidth solutions. In effect, the data vendors get to "ride for free" over the world's infrastructure, while still providing the same (and enhanced) services to their customers.

In yet another embodiment of the present invention a highly optimized data compression and decompression system is utilized to accelerate data transfers for data transmission feeds. This type of compression achieves very high compression ratios (over 10:1) on financial data feeds such as Nasdaq Quote Dissemination Service Data (NQDS) and SuperMontage Services. The information utilized to develop the methods described herein for Nasdaq has been garnered solely from public knowledge through specifications available from the Nasdaq Trader and Nasdaq websites. The techniques disclosed herein are broadly applicable to all financial data feeds and information or trading services.

Three types of encoding are utilized dependent upon the data fields and packet structure. In the event that a data field is unrecognizable then content independent data compression is preferably used, as previously discussed herein.

Variable Length Encoding

The basic unit of the compression process is the code. Each message field or set of set of fields being compressed together is assigned one or more codes in the range 0 . . . N. The code for a single character field is the ASCII value of the field minus 32 since all characters are in the range 32 to 127.

For various reasons, additional (escape) codes may be added to those for field values. For example, the category field has an escape code to indicate the end of a block and another to allow encoding of messages, which do not match the current format.

A basic technique used is variable rate encoding of symbols. In this approach, different amounts of the output bits are used to transmit the codes within a set. Higher frequency codes use less output bits while lower frequency codes use more output bits. Thus the average number of bits is reduced. Two methods of accomplishing this are used. The faster method uses a variant of Huffman coding while the slower method uses a form of Arithmetic coding.

In Huffman coding, each code is represent by an integral number of bits. The code sizes are computed using the standard algorithm and then (possibly) adjusted to facilitate table driven decoding (for instance, limiting codes to at most 16 bits). In the table driven decoding method used, there is a 256 element base table and two 256 element forwarding table. At each step, the next 8 bits of the input are used to index into the base table. If the code is represented in no more than 8 bits, it will be found directly. Otherwise, there will be a forwarding entry indicating which forwarding table to use and how many input bits to discard before using the next 8 bits as an index. The entry determining the result also indicates how many bits of the input to discard before processing the next field.

In arithmetic coding, the message is essentially represented as the (approximate) product of fractions with base 16384. The numerators of the fractions are proportional to the frequencies with which the codes appear in the training data. The number of output bits used to represent a code is the base 2 logarithm of the fraction. Thus codes which appear in almost all messages may be represented with fractions of a bit.

Single Character Codes

For arithmetic coding, all single character fields are encoded as the ASCII value−32+the number of escape codes. For Huffman coding, certain single character message fields are encoded in the same way. These include:
  MM Trade Desk
  Quote Condition
  Inside Indicator
  Quote Type Other single character fields, which have a single value that occurs most of the time, are encoded as multiple character fields (see next). In Huffman coding the smallest representation for a code is 1 bit. By combining these fields, we may encode the most common combination of values in 1 bit for the whole set. These include:
  Message Category+Message Type
  Session Identifier+Originator ID
  PMM+Bid Price Denominator+Ask Price Denominator (Quotes)
  Inside Status+Inside Type
  Inside Bid Denominator+Inside Bid MC
  Inside Ask Denominator+Inside Ask MC
  UPC Indicator+Short Sale Bid Tick
  Market of Origin+Reason Small Set Multiple Character Codes Multiple character fields with a small number of common values and certain combinations of single character fields are encoded based on the frequency of the combinations. A list of common combinations is used together with an escape code.

The common combinations are encoded using the corresponding code. All other combinations are encoded by the escape code followed by the (7 bit) ASCII values for the characters in the combination. The fields include the field sets above for Huffman coding as well as the following for both approaches:
  Retransmission Requester
  MM Location
  Currency Code Large Set Multiple Character Codes Multiple character alphabetic or alphanumeric fields for which a large number of values are possible (Issue Symbol and MMID/MPID) are encoded as follows. Trailing spaces for Issue Symbols are deleted. Then the result is encoded using:

Variable length codes for a list of the most common values together with escapes for the possible lengths of values not in the list.

A table for the first character of the field.

A table for subsequent characters in the field.

If a value is in the list of most common values, it is encoded with the corresponding code. Otherwise, the value is encoded by sending the escape code corresponding to the (truncated) length of the value, followed by the code for the first character, which is then followed by codes for the remaining characters.

Absolute Numeric Values

Numeric fields are transmitted by sending a variable length code for the number of significant bits of the value followed by the bits of the value other than the most significant bit (which is implicitly 1). For example, 27 (a 5 bit value) would be represented by the code for a 5 bit value followed by the 4 least significant bits (11). These fields include:
  Short Bid Price
  Long Bid Price
  Short Bid Size
  Long Bid Size
  Short Ask Size
  Long Ask Size
  Short Inside Bid Size
  Long Inside Bid Size
  Short Inside Ask Size
  Long Inside Ask Size Relative Numeric Values Numeric fields expected to be close to the value of numeric values occurring earlier in the message are encoded by encoding the difference between the new value and the base value as follows:

If the difference in non-negative and less than ⅛ of the base value, the difference is encoded by sending a variable length code for the number of significant bits of the difference followed by the bits of the difference other than the most significant bit (which is implicitly 1). Otherwise, the new value is encoded by sending a variable length code for the number of significant bits of the value followed by the bits of the value other than the most significant bit (which is implicitly 1). The difference significant bit codes and the value significant bit codes are mutually exclusive. The following fields are encoded using the difference compared to the field in parentheses:
  Short Ask Price (Bid Price)
  Long Ask Price (Bid Price)
  Short Inside Bid Price (Bid Price)
  Short Inside Ask Price (Inside Bid Price)
  Long Inside Bid Price (Bid Price)
  Long Inside Ask Price (Inside Bid Price)

Differences

Both time and Message Sequence Number are encoded as the difference between the new value and a previous value within the compression block. This is transmitted using a code giving the sign of the difference and the number of significant bits in the absolute value of the difference followed by the bits of the absolute value other than the first.

Date

Each message within a compression block is expected to have the same date. The base date is transmitted at the beginning of the block as 7 bits of year, 4 bits of month and 5 bits of day of the month. If the date of a message is different than that of the block, a special escape code is used in place of the encoding of the sequence number and time. This is followed by the year, month and day as above followed by the time in seconds (17 bits) and the sequence number (24 bits).

Message Sequence Number and Time

Message time is converted to seconds after midnight. For all retransmitted messages (Retransmission Requester not "O"), the time is transmitted as a 17-bit value followed by the Message Sequence Number transmitted as a 24-bit value. If the date is not the same as the block date, a time value of 0x1ffff is used as an escape code.

For the first original transmission message in a block, the Message Sequence Number and time are transmitted in the same way.

For arithmetic coding of all other original transmission messages in a block, the Message Sequence Number is transmitted as the encoded change from the Message Sequence Number of the preceding original transmission message. Similarly, the time of all other original transmission messages is encoded as the difference from the previous original transmission message. An escape code in the Message Sequence Number Difference Table is used to indicate that the date is not the same as the block date.

Since almost all sequence number changes are 1 and almost all time changes are 0, we can save a bit (while Huffman coding) by encoding time and sequence number together.

This is done as follows: The most common values for both time and sequence number changes are 0 and 1 so there are three possibilities for each: 0, 1 and something else. Together this yields nine possibilities. An escape code is added to indicate a date different from the block date. To transmit the sequence number and time, the code corresponding the correct combination is first sent and then, if the time difference is not 0 or 1, the difference code for time followed by the difference code for sequence number (if required) is sent.

Unexpected Message Types

For administrative messages or non-control messages of unexpected category or type, the body of the message (the part after the header) is encoded as a 10-bit length field followed by the characters of the body encoded as 7-bit ASCII. Any Quotation message with an unexpected Inside Indicator value will have the remainder of the message encoded similarly.

Termination Code and Error Detection

Each compression block is terminated by an escape code of the message header category or category-type table. If this code is not found before the end of the block or if it is found too soon in the block, an error is returned. It is highly unlikely that a transmission error in the compressed packet could result in decoding so as to end at the same place as the original. The exception to this would be errors in transmitting bits values such as date, time or sequence number or the least significant bits of encoded values or changes. For additional error detection, a CRC check for the original could be added to compressed block.

Experimental Results

The aforecited Data Acceleration Methods were successfully applied to data captured on NASDAQ's NQDS feed. The data captured was first analyzed to optimize the Data Acceleration Methods. Essentially two distinct data rates were evaluated; one similar to the upcoming NASDAQ SuperMontage rate of 9.0 Megabits/sec and the second being the maximum data rate of the NQDS feed of 221 Kilobits/sec. In addition, two modes of data acceleration were applied—one utilizing Arithmetic and the other utilizing Huffman techniques.

The Arithmetic routines typically use 40% more CPU time than the Huffman routines and achieve approximately 15% better compression. On average the compression ratio for the SuperMontage data rate (9.0 Megabits/sec) utilizing Arithmetic Mode, yielded a value of 9.528 with a latency under 10.0 ms. This effectively says that the NQDS feed operating at a SuperMontage rate could be transmitted over one T1 line! Further overall latency can be reduced from 500 msec to something approaching 10 milliseconds if routing delays are reduced. Since the amount of data is substantially less, it will be easier and much more cost efficient to reduce routing delays. Further, since the quantity of transmitted bits is substantially smaller, the skew amongst transmitted packets will also be proportionately lower.

The average compression ratio for the standard NQDS data rate (221 Kbits/sec) was 9.3925 for the Arithmetic Mode with a latency under 128 ms. The higher latency is due to the time required to accumulated data for blocking. Since the present invention allows for very high compression ratios with small blocks of data, the latency can be reduced substantially from 128 msec without a loss in compression ratio. This effectively says that the existing NQDS feed could be transmitted over one-half of a 56 Kilobit/sec modem line. Other advantages of using data acceleration according to the invention is that such methods inherently provide (i) a high level of encryption associated with the Arithmetic Mode (with no subsequent impact on latency) and (ii) error detection capability of the decompression methods at the end user site. The first benefit produces additional levels of security for the transmitted data and the second benefit guarantees that corrupted data will not be displayed at the end user site. Furthermore, the need to dynamically compare the redundant data feeds at the end user site is eliminated.

In yet another embodiment of the present invention the aforecited algorithms and all other data compression/decompression algorithms may be utilized in a data field specific compiler that is utilized to create new data feed and data stream specific compression algorithms.

A data field description language is utilized to define a list of possible data fields and parameters along with associated data compression encoders and parameter lists. In one embodiment of the invention the data fields are defined utilizing the following convention:

```
<start list>
<list file name (optional)>
<data field a descriptor, optional parameters>
[data field a compression algorithm x, optional parameters]
<data field b descriptor, optional parameters>
[data field b compression algorithm y, optional parameters]
...
<data field m descriptor, optional parameters>
[data field m compression algorithm n, optional parameters]
<end list>
```

Thus start list and end list are reserved identifiers however any suitable nomenclature can be utilized.

In this simple embodiment of the present invention the list is then submitted to a data compression compiler that accepts the data field list and creates two output files. The first is a data compression algorithm set comprised of data field specific encoders and the second output file is a data decompression algorithm set comprised of encoded data field specific decoders. In practice this compiler can be implemented in any high level language, machine code, or any variant in between. In addition the language can be Java, r Visual Basic, or another interpreted language to be dynamically operated over the Internet.

More advanced embodiments of the list can be created where the order of the data fields is important to the selection of encoders. In this case the fields are an ordered vector set and the encoders are also an ordered vector set.

```
<start list>
    <list file name (optional)>
    <ordered data field list 1, optional parameters>
    <data field a, optional parameters; data field b, optional parameters;
...; data field n, optional parameters;>
        [data field a compression algorithm x, optional parameters; data
        field b
            compression algorithm y, optional parameters; ...;data field m
            compression algorithm n]
        [data field b compression algorithm x, optional parameters; data
        field a
            compression algorithm y, optional parameters; ...;data field m
            compression algorithm n]
<end list>
```

In this more sophisticated embodiment the encoders are selected based upon the data fields and their specific ordering.

In yet another embodiment of the present invention the sets of ordered data fields can be assigned to sets by set name, giving the ability for nesting of sets to facilitate ease of coding.

In yet another embodiment of the present invention the optional parameters to each encoder are utilized to share parameters amongst the same or different data fields.

Although illustrative embodiments have been described herein with reference to the accompanying drawings, it is to be understood that the present invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method of decoding one or more encoded messages of a data packet in a financial data stream using a data decoding engine, wherein multiple decoders applying a plurality of lossless decompression techniques are applied to an encoded message, the method comprising:

receiving an encoded message in a data packet of the financial data stream having a plurality of data fields associated with the encoded message and one or more descriptors comprising one or more values, wherein the one or more descriptors indicate data field types of the data fields and lossless encoders used to encode the data fields, and further wherein the lossless encoders are selected based on analyses of content of the data fields;

analyzing the encoded message to identify a descriptor;

selecting one or more lossless decoders for a data field associated with the encoded message, wherein the selecting is based on the descriptor and a description file, and further wherein the description file comprises data field types and associated lossless decoders;

decoding the data field with a selected lossless decoder utilizing content dependent data decompression, if the descriptor indicates the data field is encoded utilizing content dependent data compression; and decoding the data field with a selected lossless decoder utilizing content independent data decompression, if the descriptor indicates the data field is encoded utilizing content independent data compression.

2. The method of claim 1, wherein the one or more lossless decoders are further selected based upon the specific ordering of the data field in the encoded message.

3. The method of claim 1, wherein the descriptor comprises values corresponding to a single applied decompression technique or multiple decompression techniques applied in a specific order.

4. The method of claim 1, further comprising initiating the method of decoding one or more encoded messages of a data packet in a financial data stream using a synchronization point, wherein the financial data stream includes a plurality of synchronization points.

5. The method of claim 4, wherein the one or more encoded messages of a data packet are included in a broadcast to a plurality of client systems.

6. The method of claim 1, wherein decoding the data field comprises packet independent data decoding.

7. The method of claim 1, further comprising providing one or more global state machines and one or more adaptive local state machines.

8. The method of claim 7, further comprising:

storing in one or more of the global state machines data fields that are likely to repeat in the financial data stream based on a priori knowledge of the data stream; and storing in one or more of the adaptive local state machines the decoded data field such that the data field is available to decode one or more other data fields.

9. The method of claim 8, further comprising resetting one or more of the adaptive local state machines at a determinate point of the data packet.

10. The method of claim 1, wherein the time of receiving and decoding the one or more encoded messages of a data packet is less than the time to receive the one or more encoded messages of a data packet in unencoded form.

11. The method of claim 1, wherein the method of decoding one or more encoded messages of a data packet in a financial data stream achieves an expansion ratio of at least 1:10.

12. The method of claim 1, wherein the method of decoding one or more encoded messages of a data packet in a financial data stream is performed in real-time.

13. A system for encoding a plurality of data blocks to create an encoded data packet in a financial data stream, wherein multiple encoders applying a plurality of lossless compression techniques are applied to a plurality of data blocks, the system comprising:

an input interface that receives a data block from the plurality of data blocks;

a memory with a fixed table of data blocks based on a priori knowledge of the financial data stream and an adaptive table of data blocks;

a data encoding engine operatively connected to said input interface and said memory having a computer readable program code of instructions executable by the data encoding engine, said instructions comprising instructions to:

analyze content of the data block to determine a data block type;

select one or more lossless encoders for the data block based on the data block type and a computer file, wherein the computer file indicates data block types and associated encoders;
encode the data block with a selected lossless encoder using a data block in said adaptive table identified by said selected lossless encoder, if available, otherwise using a data block in said fixed table identified by said selected lossless encoder; and
store the data block in said adaptive table, such that the data block is available to encode one or more other data blocks; and
an output interface operatively connected to said data encoding engine that outputs the encoded data packet with a descriptor comprising one or more values, wherein the descriptor indicates the selected one or more lossless encoders.

14. The system of claim 13, wherein the data block corresponds to a data field of a message.

15. The system of claim 13, wherein the memory resets the adaptive table at a determinate point of the data packet.

16. The system of claim 13, wherein the system for encoding includes a plurality of synchronization points in the financial data stream for initiating decoding the financial data stream.

17. The system of claim 13, further comprising instructions executable by the data encoding engine to encode one or more data blocks with a selected lossless encoder utilizing content independent data compression, if the data block type is associated with a lossless encoder utilizing content independent data compression.

18. The system of claim 13, wherein the data encoding engine performs packet independent data encoding.

19. The system of claim 13, wherein the instructions to encode the data block with a selected lossless encoder comprises using a difference between the data block and a data block in the adaptive table.

20. The system of claim 13, wherein the system for encoding a plurality of data blocks to create an encoded data packet in a financial data stream achieves a compression ratio of at least 10:1.

21. The system of claim 13, wherein the system for encoding a plurality of data blocks to create an encoded data packet in a financial data stream operates in real-time.

22. A system for encoding a plurality of data blocks to create an encoded data packet in a financial data stream, wherein multiple encoders applying a plurality of lossless compression techniques are applied to a plurality of data blocks, the system comprising:
an input interface that receives a data block;
a data encoding engine operatively connected to said input interface having a computer readable program code of instructions executable by the data encoding engine, said instructions comprising instructions to:
analyze content of the data block to determine a data block type;
select one or more lossless encoders based on the data block type and a computer file, wherein the computer file indicates data block types and associated encoders;
encode the data block with a selected lossless encoder utilizing content dependent data compression, if the data block type is recognized as associated with a lossless encoder utilizing content dependent data compression; and
encode the data block with a selected lossless encoder utilizing content independent data compression, if the data block type is not recognized as associated with a lossless encoder utilizing content dependent data compression; and
an output interface operatively connected to said data encoding engine that outputs a descriptor comprising one or more values in the encoded data packet in the financial data stream, wherein the descriptor indicates the one or more selected lossless encoders.

23. The system of claim 22, wherein the data block corresponds to a data field of a message.

24. The system of claim 22, wherein the system for encoding includes a plurality of synchronization points in the financial data stream for initiating decoding the financial data stream.

25. The system of claim 22, wherein the data encoding engine performs packet independent data encoding.

26. The system of claim 22, further comprising one or more global state machines and one or more adaptive local state machines operatively connected to said data encoding engine.

27. The system of claim 26, wherein the one or more global state machines store data blocks that are likely to repeat in the financial data stream based on a priori knowledge of the data stream and the one or more adaptive local state machines store the received data block such that the data block is available to encode one or more other data blocks.

28. The system of claim 27, wherein the one or more adaptive local state machines reset at a determinate point of the data packet.

29. A method of encoding a plurality of data blocks to create an encoded data packet in a financial data stream using a data encoding engine, wherein multiple encoders applying a plurality of lossless compression techniques are applied to a plurality of data blocks, the method comprising:
receiving a data block from the plurality of data blocks;
analyzing content of the data block to determine a data block type;
selecting one or more lossless encoders based on the data block type and a computer file, wherein the computer file indicates data block types and associated encoders;
encoding the data block with a selected lossless encoder utilizing content dependent data compression, if the data block type is recognized as associated with a lossless encoder utilizing content dependent data compression;
encoding the data block with a selected lossless encoder utilizing content independent data compression, if the data block type is not recognized as associated with a lossless encoder utilizing content dependent data compression; and
providing a descriptor for the encoded data packet in the financial data stream, wherein the descriptor indicates the one or more selected lossless encoders for the encoded data block.

30. The method of claim 29, wherein the data block corresponds to a data field of a message.

31. The method of claim 29, further comprising including a plurality of synchronization points in the financial data stream for initiating decoding the financial data stream.

32. The method of claim 31, wherein the encoded data packet in the financial data stream is broadcast to a plurality of client systems.

33. The method of claim 32, wherein the encoded data packet is a User Datagram Protocol (UDP) data packet.

34. The method of claim 29, wherein the encoding comprises packet independent data encoding.

35. The method of claim 29, further comprising providing one or more global state machines and one or more adaptive local state machines.

36. The method of claim 35, further comprising:
    storing in one or more of the global state machines data blocks that are likely to repeat in the financial data stream based on a priori knowledge of the data stream; and
    storing in one or more of the adaptive local state machines the received data block such that the data block is available to encode one or more other data blocks.

37. The method of claim 36, further comprising resetting one or more of the adaptive local state machines at a determinate point of the encoded data packet.

38. The method of claim 29, wherein encoding the data block utilizing content dependent data compression comprises using a difference between data blocks in the encoded data packet.

39. The method of claim 29, wherein the time of encoding the plurality of data blocks and transmitting the encoded data packet is less than the time to transmit the plurality of data blocks in unencoded form.

40. The method of claim 29, wherein the plurality of data blocks includes one or more of stock, options, and futures information.

41. The method of claim 29, wherein the descriptor comprises values corresponding to a single applied compression technique or multiple compression techniques applied in a specific order.

42. The method of claim 29, wherein the method of encoding a plurality of data blocks to create an encoded data packet in a financial data stream is performed in real-time.

43. A method of encoding a plurality of data blocks to create an encoded data packet for a financial data stream using a data encoding engine, wherein multiple encoders applying a plurality of lossless compression techniques are applied to a plurality of data blocks, the method comprising:
    providing a fixed table of data blocks based on a priori knowledge of the financial data stream;
    providing an adaptive table of data blocks;
    receiving a data block from the plurality of data blocks;
    analyzing content of the data block to determine a data block type;
    selecting one or more lossless encoders for the data block based on the data block type and a computer file, wherein the computer file indicates data block types and associated encoders;
    encoding the data block with a selected lossless encoder using a data block in said adaptive table identified by said selected lossless encoder, if available, otherwise using a data block in said fixed table identified by said selected lossless encoder;
    storing the data block in said adaptive table, such that the data block is available to encode one or more other data blocks; and
    providing a descriptor for the encoded data packet, wherein the descriptor indicates the selected one or more lossless encoders for the encoded data block.

44. The method of claim 43, wherein the data block corresponds to a data field of a message.

45. The method of claim 43, further comprising resetting the adaptive table at a determinate point of the encoded data packet.

46. The method of claim 43, further comprising including a plurality of synchronization points in the financial data stream for initiating decoding the financial data stream.

47. The method of claim 43, wherein encoding the data block comprises packet independent data encoding.

48. The method of claim 43, further comprising encoding one or more of the plurality of data blocks with a selected lossless encoder utilizing content independent data compression, if the data block type is associated with a lossless encoder utilizing content independent data compression.

49. The method of claim 43, wherein encoding the data block with a selected lossless encoder comprises using a difference between the data block and a data block in the adaptive table.

50. The method of claim 43, wherein the method of encoding a plurality of data blocks to create an encoded data packet in a financial data stream achieves a compression ratio of at least 10:1.

51. The method of claim 43, wherein the method of encoding a plurality of data blocks to create an encoded data packet in a financial data stream is performed in real-time.

52. A method of encoding one or more messages to create an encoded data packet for a financial data stream using a data encoding engine, wherein multiple encoders applying a plurality of lossless compression techniques are applied to a plurality of data fields of a message, the method comprising:
    providing a fixed table of data fields based on a priori knowledge of the financial data stream;
    providing an adaptive table of data fields;
    receiving a message from the one or more messages;
    analyzing content of a data field in the message to determine a data field type;
    selecting one or more lossless encoders for the data field based on the data field type and a computer file, wherein the computer file indicates data block types and associated encoders;
    encoding the data field with a selected lossless encoder using a data field in said adaptive table identified by said selected lossless encoder, if available, otherwise using a data field in said fixed table identified by said selected lossless encoder;
    storing the data field in said adaptive table, such that the data field is available to encode one or more other data fields; and
    providing a descriptor for the encoded data packet, wherein the descriptor indicates the selected one or more lossless encoders for the encoded data field.

53. The method of claim 52, further comprising resetting the adaptive table at a determinate point of the data packet.

54. The method of claim 52, further comprising including a plurality of synchronization points in the financial data stream for initiating decoding the financial data stream.

55. The method of claim 52, wherein encoding the data field comprises packet independent data encoding.

56. The method of claim 52, further comprising encoding one or more data fields with a selected lossless encoder utilizing content independent data compression, if the data field type is associated with a lossless encoder utilizing content independent data compression.

57. The method of claim 52, wherein encoding the data field with a selected lossless encoder comprises using a difference between the data field and a data field in the adaptive table.

58. The method of claim 52, wherein the method of encoding one or more messages to create an encoded data packet for a financial data stream is performed in real-time.

59. The method of claim 52, wherein the method of encoding one or more messages to create an encoded data packet for a financial data stream achieves a compression ratio of at least 10:1.

60. A system for encoding one or more messages to create an encoded data packet in a financial data stream, wherein multiple encoders applying a plurality of lossless compression techniques are applied to a plurality of data fields of a message, the system comprising:
- an input interface that receives a message, wherein the message comprises a plurality of data fields;
- a data encoding engine operatively connected to said input interface having a computer readable program code of instructions executable by the data encoding engine, said instructions comprising instructions to:
  - analyze content of a data field of the message to determine a data field type;
  - select one or more lossless encoders based on the data field type and a description file, wherein the description file indicates data field types and associated encoders;
  - encode the data field with a selected lossless encoder utilizing content dependent data compression, if the data block type is recognized as associated with a lossless encoder utilizing content dependent data compression; and
  - encode the data field with a selected lossless encoder utilizing content independent data compression, if the data block type is not recognized as associated with a lossless encoder utilizing content dependent data compression; and
- an output interface operatively connected to said data encoding engine that outputs a descriptor in the encoded data packet in the financial data stream, wherein the descriptor indicates the selected one or more lossless encoders.

61. The system of claim 60, wherein the system for encoding includes a plurality of synchronization points in the financial data stream for initiating decoding the financial data stream.

62. The system of claim 61, wherein the encoded data packet is included in a broadcast to a plurality of client systems.

63. The system of claim 60, wherein the data encoding engine performs packet independent data encoding.

64. The system of claim 60, further comprising one or more global state machines and one or more adaptive local state machines operatively connected to said data encoding engine.

65. The system of claim 64, wherein the one or more global state machines store data fields that are likely to repeat in the financial data stream based on a priori knowledge of the data stream and the one or more adaptive local state machines store the data field such that the data field is available to encode one or more other data fields.

66. The system of claim 65, wherein the one or more adaptive local state machines reset at a determinate point of the data packet.

67. The system of claim 60, wherein the instructions to encode the data field utilizing content dependent data compression comprises using a difference between the content of data fields in the encoded data packet.

68. The system of claim 60, wherein the time of encoding the one or more messages and transmitting the encoded data packet in the financial data stream is less than the time to transmit the one or more messages in unencoded form.

69. The system of claim 60, wherein the one or more messages include one or more of stock, options, and futures information.

70. The system of claim 60, wherein the one or more messages include financial news.

71. The system of claim 60, wherein the system for encoding one or more messages to create an encoded data packet in a financial data stream achieves a compression ratio of at least 10:1.

72. The system of claim 60, wherein the system for encoding one or more messages to create an encoded data packet in a financial data stream operates in real-time.

73. A method of decoding one or more encoded data packets of a financial data stream using a data decoding engine, wherein multiple decoders applying a plurality of lossless decompression techniques are applied to an encoded data packet, the method comprising:
- receiving an encoded data packet from the financial data stream having one or more descriptors comprising one or more values, wherein the one or more descriptors indicate lossless encoders used to encode data blocks associated with the encoded data packet, and further wherein the lossless encoders are selected based on analyses of content of the data blocks;
- analyzing the encoded data packet of the financial data stream to identify a descriptor;
- selecting one or more lossless decoders for a data block associated with the data packet, wherein the selecting is based on the descriptor;
- decoding the data block with a selected lossless decoder utilizing content dependent data decompression, if the descriptor indicates the data block is encoded utilizing content dependent data compression; and
- decoding the data block with a selected lossless decoder utilizing content independent data decompression, if the descriptor indicates the data block is encoded utilizing content independent data compression.

74. The method of claim 73, wherein the data block corresponds to a data field associated with a message in the encoded data packet of the financial data stream.

75. The method of claim 73, wherein the descriptor comprises values corresponding to a single applied decompression technique or multiple decompression techniques applied in a specific order.

76. The method of claim 73, wherein decoding the data block utilizing content independent data decompression occurs prior to decoding the data block utilizing content dependent data decompression.

77. The method of claim 73, further comprising initiating the method of decoding one or more encoded data packets of a financial data stream using a synchronization point, wherein the financial data stream includes a plurality of synchronization points.

78. The method of claim 77, wherein the one or more encoded data packets of the financial data stream are broadcast to a plurality of client systems.

79. The method of claim 78, wherein the one or more encoded data packets are User Datagram Protocol (UDP) data packets.

80. The method of claim 73, wherein decoding the data block comprises packet independent data decoding.

81. The method of claim 73, further comprising providing one or more global state machines and one or more adaptive local state machines.

82. The method of claim 81, further comprising:
- storing in one or more of the global state machines data blocks that are likely to repeat in the financial data stream based on a priori knowledge of the data stream; and
- storing in one or more of the adaptive local state machines the decoded data block such that the data block is available to decode one or more other data blocks.

83. The method of claim 82, further comprising resetting one or more of the adaptive local state machines at a determinate point of the data packet.

84. The method of claim 73, wherein decoding the data block utilizing content dependent data decompression comprises using a difference between data blocks in the encoded data packet.

85. The method of claim 73, wherein the time of receiving and decoding the one or more encoded data packets is less than the time to receive the one or more encoded data packets in unencoded form.

86. The method of claim 73, wherein the one or more encoded data packets include one or more of stock, options, and futures information.

87. The method of claim 73, wherein the one or more encoded data packets include financial news.

88. The method of claim 73, wherein the method of decoding one or more encoded data packets of a financial data stream achieves an expansion ratio of at least 1:10.

89. The method of claim 73, wherein the method of decoding one or more encoded data packets of a financial data stream is performed in real-time.

90. The method of claim 73, wherein the one or more encoded data packets of the financial data stream is transmitted to one or more client systems utilizing TCP/IP.

91. A method of decoding one or more encoded data packets in a financial data stream using a data decoding engine, wherein multiple decoders applying a plurality of lossless decompression techniques are applied to an encoded data packet, the method comprising:
  providing a fixed table of data blocks based on a priori knowledge of the financial data stream;
  providing an adaptive table of data blocks;
  receiving an encoded data packet from the financial data stream having one or more descriptors comprising one or more values, wherein the one or more descriptors indicate lossless encoders used to encode data blocks associated with the encoded data packet, and further wherein the lossless encoders are selected based on analyses of content of the data blocks;
  analyzing the encoded data packet to identify a descriptor;
  selecting one or more lossless decoders for a data block associated with the encoded data packet, wherein the selecting is based on the descriptor;
  decoding the data block with a selected lossless decoder using a data block in said adaptive table identified by said selected lossless decoder, if available, otherwise using a data block in said fixed table identified by said selected lossless decoder; and
  storing the decoded data block in said adaptive table, such that the decoded data block is available to decode one or more other data blocks.

92. The method of claim 91, wherein the data block corresponds to a data field associated with a message in the encoded data packet of the financial data stream.

93. The method of claim 91, further comprising resetting the adaptive table at a determinate point of the encoded data packet.

94. The method of claim 91, further comprising initiating the method of decoding one or more encoded data packets in a financial data stream using a synchronization point, wherein the financial data stream includes a plurality of synchronization points.

95. The method of claim 91, wherein decoding the data block comprises packet independent data decoding.

96. The method of claim 91, further comprising decoding one or more data blocks with a selected lossless decoder utilizing content independent data decompression, if the descriptor indicates the data block is encoded utilizing content independent data compression.

97. The method of claim 91, wherein decoding the data block with a selected lossless decoder comprises using a difference between the data block and a data block in the adaptive table.

98. A system for decoding one or more encoded data packets of a financial data stream, wherein multiple decoders applying a plurality of lossless decompression techniques are applied to an encoded data packet, the system comprising:
  an input interface that receives an encoded data packet from the financial data stream having one or more descriptors comprising one or more values, wherein the one or more descriptors indicate lossless encoders used to encode data blocks associated with the encoded data packet, and further wherein the lossless encoders are selected based on analyses of content of the data blocks;
  a data decoding engine operatively connected to said input interface having a computer readable program code of instructions executable by the data decoding engine, said instructions comprising instructions to:
    analyze the encoded data packet of the financial data stream to identify a descriptor;
    select one or more lossless decoders for a data block associated with the encoded data packet, wherein the selecting is based on the descriptor;
    decode the data block with a selected lossless decoder utilizing content dependent data decompression, if the descriptor indicates the data block is encoded utilizing content dependent data compression; and
    decode the data block with a selected lossless decoder utilizing content independent data decompression, if the descriptor indicates the data block is encoded utilizing content independent data compression; and
  an output interface operatively connected to said data decoding engine that outputs data from the data packet.

99. The system of claim 98, wherein the data block corresponds to a data field associated with a message in the encoded data packet of the financial data stream.

100. The system of claim 98, wherein the descriptor comprises values corresponding to a single applied decompression technique or multiple decompression techniques applied in a specific order.

101. The system of claim 98, wherein the system for decoding initiates decoding the one or more encoded data packets of the financial data stream using a synchronization point, and further wherein the financial data stream includes a plurality of synchronization points.

102. The system of claim 98, wherein the data decoding engine performs packet independent data decoding.

103. The system of claim 98, further comprising one or more global state machines and one or more adaptive local state machines operatively connected to said data decoding engine.

104. The system of claim 103, wherein the one or more global state machines store data blocks that are likely to repeat in the financial data stream based on a priori knowledge of the data stream and the one or more adaptive local state machines store the decoded data block such that the data block is available to decode one or more other data blocks.

105. The system of claim 104, wherein the one or more adaptive local state machines reset at a determinate point of the encoded data packet.

106. The system of claim 98, wherein the system for decoding one or more encoded data packets of a financial data stream achieves an expansion ratio of at least 1:10.

107. The system of claim 98, wherein the system for decoding one or more encoded data packets of a financial data stream operates in real-time.

108. A system for decoding one or more data packets in a financial data stream, wherein multiple decoders applying a plurality of lossless decompression techniques are applied to an encoded data packet, the system comprising:

an input interface that receives an encoded data packet from the financial data stream having one or more descriptors comprising one or more values, wherein the one or more descriptors indicate lossless encoders used to encode data blocks associated with the data packet, and further wherein the lossless encoders are selected based on analyses of content of the data blocks;

a memory with a fixed table of data blocks based on a priori knowledge of the financial data stream and an adaptive table of data blocks;

a data decoding engine operatively connected to said input interface and said memory having a computer readable program code of instructions executable by the data decoding engine, said instructions comprising instructions to:

analyze the encoded data packet to identify a descriptor;

select one or more lossless decoders for a data block associated with the encoded data packet, wherein the selecting is based on the descriptor;

decode the data block with a selected lossless decoder using a data block in said adaptive table identified by said selected lossless decoder, if available, otherwise using a data block in said fixed table identified by said selected lossless decoder; and store the decoded data block in said adaptive table, such that the decoded data block is available to decode one or more other data blocks; and an output interface operatively connected to said data decoding engine that outputs data from the data packet.

109. The system of claim 108, wherein the data block corresponds to a data field associated with a message in the encoded data packet of the financial data stream.

110. The system of claim 108, wherein the memory resets the adaptive table at a determinate point of the data packet.

111. The system of claim 108, wherein the system for decoding initiates decoding the one or more data packets in a financial data stream using a synchronization point, and further wherein the financial data stream includes a plurality of synchronization points.

112. The system of claim 108, wherein the data decoding engine performs packet independent data decoding.

113. The system of claim 108, further comprising instructions executable by the data decoding engine to decode one or more data blocks with a selected lossless decoder utilizing content independent data decompression, if the descriptor indicates the data block is encoded utilizing content independent data compression.

114. The system of claim 108, wherein the instructions to decode the data block with a selected lossless decoder comprises using a difference between the data block and a data block in the adaptive table.

115. A system for decoding one or more encoded messages of a data packet in a financial data stream, wherein multiple decoders applying a plurality of lossless decompression techniques are applied to an encoded message, the system comprising:

an input interface that receives an encoded message in a data packet from the financial data stream having a plurality of data fields associated with the encoded message and one or more descriptors comprising one or more values, wherein the one or more descriptors indicate data field types of the data fields and lossless encoders used to encode the data fields, and further wherein the lossless encoders are selected based on analyses of content of the data fields;

a memory with a fixed table of data fields based on a priori knowledge of the financial data stream and an adaptive table of data fields;

a data decoding engine operatively connected to said input interface and said memory having a computer readable program code of instructions executable by the data decoding engine, said instructions comprising instructions to:

analyze the encoded message to identify a descriptor;

select one or more lossless decoders for a data field associated with the encoded message, wherein the selecting is based on the descriptor and a description file, and further wherein the description file comprises data field types and associated lossless decoders;

decode the data field with a selected lossless decoder using a data field in said adaptive table identified by said selected lossless decoder, if available, otherwise using a data field in said fixed table identified by said selected lossless decoder; and store the decoded data field in said adaptive table, such that the decoded data field is available to decode one or more other data fields; and an output interface operatively connected to said data decoding engine that outputs data from the data packet.

116. The system of claim 115, wherein the memory resets the adaptive table at a determinate point of the data packet.

117. The system of claim 115, wherein the system for decoding initiates decoding the one or more encoded messages using a synchronization point, wherein the financial data stream includes a plurality of synchronization points.

118. The system of claim 115, wherein the data decoding engine performs packet independent data decoding.

119. The system of claim 115, wherein the instructions to select one or more lossless decoders is further based upon the specific ordering of the data field in the encoded message.

120. The system of claim 115, further comprising instructions executable by the data decoding engine to decode the data field with a selected lossless decoder utilizing content independent data decompression, if the descriptor indicates the data block is encoded utilizing content independent data compression.

121. The system of claim 115, wherein the instructions to decode the data block with a selected lossless decoder comprises using a difference between the data field and a data field in the adaptive table.

122. The system of claim 115, wherein the system for decoding one or more encoded messages of a data packet in a financial data stream achieves an expansion ratio of at least 1:10.

123. The system of claim 115, wherein the system for decoding one or more encoded messages of a data packet in a financial data stream operates in real-time.

* * * * *

(12) INTER PARTES REEXAMINATION CERTIFICATE (1299th)
United States Patent
Fallon et al.

(10) Number: US 7,777,651 C1
(45) Certificate Issued: *Jul. 8, 2016

(54) SYSTEM AND METHOD FOR DATA FEED ACCELERATION AND ENCRYPTION

(75) Inventors: James J. Fallon, Armonk, NY (US); Paul F. Pickel, Bethpage, NY (US); Stephen J. McErlain, New York, NY (US); Carlton W. Melone, Ridgewood, NJ (US)

(73) Assignee: Realtime Data, LLC

Reexamination Request:
No. 95/001,581, Mar. 21, 2011

Reexamination Certificate for:
Patent No.: 7,777,651
Issued: Aug. 17, 2010
Appl. No.: 12/131,631
Filed: Jun. 2, 2008

(*) Notice: This patent is subject to a terminal disclaimer.

Related U.S. Application Data

(63) Continuation of application No. 10/434,305, filed on May 7, 2003, now Pat. No. 7,417,568, and a continuation-in-part of application No. 09/969,987, filed on Oct. 3, 2001, now Pat. No. 9,143,546.

(60) Provisional application No. 60/378,517, filed on May 7, 2002, provisional application No. 60/237,571, filed on Oct. 3, 2000.

(51) Int. Cl.
| | |
|---|---|
| H03M 7/34 | (2006.01) |
| G06Q 40/04 | (2012.01) |
| G06Q 50/18 | (2012.01) |
| H04L 12/18 | (2006.01) |
| H04L 29/06 | (2006.01) |
| H04L 29/08 | (2006.01) |

(52) U.S. Cl.
CPC .............. *G06Q 40/04* (2013.01); *G06Q 50/188* (2013.01); *H04L 12/1895* (2013.01); *H04L 29/06027* (2013.01); *H04L 65/607* (2013.01); *H04L 65/80* (2013.01); *H04L 67/26* (2013.01); *H04L 69/04* (2013.01)

(58) Field of Classification Search
CPC ...................................................... G06Q 40/40
USPC ........................................................ 341/51
See application file for complete search history.

(56) References Cited

To view the complete listing of prior art documents cited during the proceeding for Reexamination Control Number 95/001,581, please refer to the USPTO's public Patent Application Information Retrieval (PAIR) system under the Display References tab.

*Primary Examiner* — Deandra Hughes

(57) ABSTRACT

The transmission of broadcast data, such as financial data and news feeds, is accelerated over a communication channel using data compression and decompression to provide secure transmission and transparent multiplication of communication bandwidth, as well as reduce latency. Broadcast data may include packets having fields. Encoders associated with particular fields may be selected to compress those particular fields.

Attention is directed to the decision of *Realtime Data LLC D/B/A/ Ixo v. Cme Group, Inc. Et Al.*, 1:11cv6702 (USDC Southern NY); *Realtime Data LLC D/B/A Ixo v. Thomson Reuters Corporation et al.*, 1:11cv6703 (USDC Southern NY); *Realtime Data LLC D/B/A/ Ixo v. Morgan Stanley et al.*, 1:11cv6704 (USDC Southern NY) relating to this patent. This reexamination may not have resolved all questions raised by these decisions. See 37 CFR 1.552(c) for *ex parte* reexamination and 37 CFR 1.906(c) for *inter partes* reexamination.

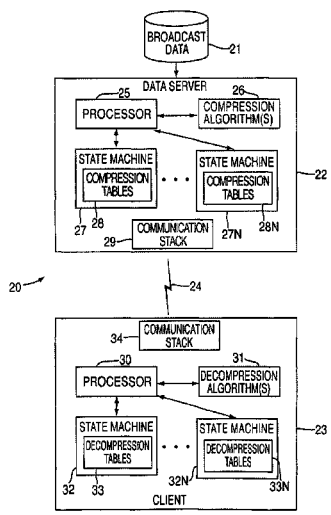

INTER PARTES REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-123 are cancelled.

\* \* \* \* \*